US010541809B2

(12) United States Patent
Godfrey et al.

(10) Patent No.: US 10,541,809 B2
(45) Date of Patent: Jan. 21, 2020

(54) CHIP-BASED QUANTUM KEY DISTRIBUTION

(71) Applicant: The University of Bristol, Bristol (GB)

(72) Inventors: Mark Godfrey, Bristol (GB); Mark Thompson, Bristol (GB); Philip Sibson, Bristol (GB)

(73) Assignee: The University of Bristol, Bristol (GB)

( * ) Notice: Subject to any disclaimer, the term of this patent is extended or adjusted under 35 U.S.C. 154(b) by 224 days.

(21) Appl. No.: 15/556,762

(22) PCT Filed: Mar. 8, 2016

(86) PCT No.: PCT/GB2016/050634
§ 371 (c)(1),
(2) Date: Sep. 8, 2017

(87) PCT Pub. No.: WO2016/142701
PCT Pub. Date: Sep. 15, 2016

(65) Prior Publication Data
US 2018/0062838 A1    Mar. 1, 2018

(30) Foreign Application Priority Data
Mar. 10, 2015 (GB) ..................... 1504047

(51) Int. Cl.
*H04L 9/08* (2006.01)
*H04B 10/70* (2013.01)
*G02F 1/09* (2006.01)

(52) U.S. Cl.
CPC ........... *H04L 9/0855* (2013.01); *H04B 10/70* (2013.01); *H04L 9/0858* (2013.01); *G02F 1/09* (2013.01)

(58) Field of Classification Search
CPC ....... H04L 9/08; H04L 9/0852; H04L 9/0855; H04B 10/70
See application file for complete search history.

(56) References Cited

U.S. PATENT DOCUMENTS

| 5,307,410 | A  | * | 4/1994 | Bennett ............. | H04L 9/0852 380/256 |
| 6,438,234 | B1 | * | 8/2002 | Gisin ................ | H04L 9/0852 380/256 |
| 2012/0195428 | A1 | * | 8/2012 | Wellbrock ........ | H04L 9/0855 380/255 |

FOREIGN PATENT DOCUMENTS

| EP | 1499040 A2 | 1/2005 |
| GB | 2430123 A | 3/2007 |
| WO | 1995/07584 A | 3/1995 |

OTHER PUBLICATIONS

Intellectual Property Office of United Kingdom, Corrected Search Report for United Kingdom Application GB1504047.0, dated Sep. 10, 2015.

(Continued)

*Primary Examiner* — Ponnoreay Pich
(74) *Attorney, Agent, or Firm* — Kilpatrick Townsend & Stockton LLP

(57) ABSTRACT

There is provided an integrated-optic transmitter for transmitting light pulses to a further optical apparatus for generating a quantum cryptographic key according to at least one quantum cryptography technique. There is also provided an integrated-optic receiver for generating a quantum cryptographic key from light pulses received from a further optical apparatus. The transmitter apparatus splits incoming light into two paths to temporally separate the split light pulses and controls the output intensity of each split pulse as well as the phase of at least one of the split pulses. The receiver apparatus receives first and second light pulses and controls the output intensity of each said pulse between a first and a second optical detector. The light input into the second detector passes through an integrated element that controls the amount of light output into two paths that (Continued)

recombine before at least a portion is output to the second detector.

20 Claims, 21 Drawing Sheets

(56) References Cited

OTHER PUBLICATIONS

European Patent Office, International Search Report for International Application PCT/GB2016/050634, dated Jul. 1, 2016.
Toliver, P., et al., "Experimental investigation of quantum key distribution through transparent optical switch elements," IEEE Photonics Technology Letters, Nov. 1, 2003, pp. 1669-1671.
Sibson, P., et al., "Chip-based Quantum Key Distribution," Sep. 2, 2015 URL:http://arxiv.org/pdf/1509.00768.pdf.

* cited by examiner

CHIP-BASED QUANTUM KEY DISTRIBUTION

The present invention is in the field of optical communications in particular optical communications where a secure communication channel is set-up using a quantum cryptographic key.

Information security is becoming increasingly relevant in modern day society particularly where information is shared over communication channels. In order to prevent unwanted eavesdroppers intercepting information, several forms of encrypted communications have arisen. Cryptography is the field of encoding a message so that only the intended person or end user can successfully read the message.

Traditional public-key cryptographic systems of encoding often involve making it difficult, but not impossible, for an eavesdropper to decode the message due to the difficulty of factorising large numbers. These traditional encryption techniques however are difficult to break rather than being inherently secure. If a technique to efficiently factorise large numbers is developed then messages using such traditional encryption techniques may be subject to security breaches.

The field of quantum cryptography uses the principles of quantum mechanics and aims to overcome some of the inherent deficiencies in traditional cryptography systems by providing a reliable way of transmitting a secret key and knowing that no-one else has intercepted it along the way. The sharing of the secret key is often termed as Quantum Key Distribution (QKD). Several QKD schemes are known and are roughly divided into two categories, those that rely on the quantum mechanical principle of measuring single particles and those that rely on the quantum properties of entangled states.

Several different quantum cryptographic techniques (often called protocols) exist that enable the creation and exchange of a secure key wherein each technique is configured to generate the key data and provide a methodology or means to ensure the secrecy of the key. Examples of protocols include the Bennett-Brassard 84 (BB84) protocol, the Coherent One Way (COW) protocol, the Differential Phase Shift (DPS) protocol and the Reference Frame Independent (RFI) protocol.

Several devices are known to transmit and receive optical signals for generating a quantum key.

U.S. Pat. No. 7,787,628 B2 describes a first node sending the quantum key having a faraday mirror coupled to a phase modulator and a second node receiving the quantum key having an attenuator, two phase modulators, a polarisation beam splitter (PBS), a coupler, a photon source and a detector. The second node generates laser pulses that are split into long and short loops. The pulse in the long loop gets encoded with a secret phase known only to the second node and its horizontal polarisation selected by the PBS gets attenuated and fed into a quantum channel to the first node. The first node receives the pulse, phase modulates the pulse with a phase shift value characterised by a quantum encoding basis and a polarity. The Faraday mirror then flips the pulse's polarisation causing a 90 degree phase change and the pulse is then fed back to the second node. The second pulse travelling along the short loop in the second node has its vertical polarisation transmitted by the PBS, attenuated and sent along a quantum channel. The first node processes the second pulse in a similar way to the first pulse. This scheme uses different polarisations in the pulses it transmits and therefore uses bulky optical components. Furthermore it only uses one method of key generation for the short and long delayed pulses. A different device set-up is used for the different nodes.

International patent application WO 2014060793 describes a mobile communications device with apparatus for communicating over an optical channel. This application shows the possibility to wavelength convert the optical key before transmission. Examples of encoding and decoding are shown in FIGS. 4 and 5 of WO 2014060793 where three light sources are used to encode via three polarisation state emission. A 3-2 integrated optics converter is used to give dual rail encodings which are then converted into a polarisation encoding with a polarisation rotator/combiner. A 3-2 integrated optic converter is made from a 50/50 beam splitter and two Y-junctions. An attenuator is shown to be applied to bring the light pulses down to single photon level. The decoder has a spectral filter, a polarisation rotator/splitter and an integrated 2-6 converter for converting dual rail encoding to six separate channels. The integrated 2-6 converter having two beam splitters, two phase shifters and four Y junctions. A different device set-up is used for the encoder and decoder.

International patent application WO2014042822 describes a quantum communications (QC) system with integrated photonic devices. Decoy pulses are encoded onto a transmitted optical signal as a result of using sources not being true single photon laser sources. A variable optical attenuator randomly imposes photon values. By measuring and comparing photon distributions for a received QC signal, a single photon transmittance is estimated. Polarisation rotation is used to compensate for fibre birefringence. The transmitter is configured to transmit in conjugate polarisation bases wherein transmitter components can be fabricated as part of a monolithic or hybrid chip-scale circuit. This document teaches to utilise polarisation rotation in the generation of the quantum key. The component set-ups shown are configured to generate a quantum key using only a single set of bases. A different device set-up is used to modulate and demodulate the quantum communication photonic signal.

According to a first aspect of the present invention there is provided an optical apparatus for transmitting light pulses to a further optical apparatus for generating a quantum cryptographic key according to at least one quantum cryptography technique; the quantum cryptography technique at least comparing the phase difference between at least two light pulses; the optical apparatus comprising: an integrated optical splitter configured to: receive at least one input light pulse, split the input light pulse into: a first light pulse propagating along a first integrated optical path; and, a second light pulse propagating along a second integrated optical path, wherein the second integrated optical path comprises an optical path length that: is longer than the first integrated optical path; and, temporally separates the first and second light pulses; and, an integrated optical intensity controller configured to: receive the temporally separated first and second light pulses from the respective first and second integrated optical paths; and, control the relative intensities of the first and second light pulses output from the controller for transmission to the further optical apparatus; and, a phase modulator configured to change the phase of at least one of the first or second light pulses output from the optical apparatus.

The first aspect may be modified in any suitable way as disclosed herein including but not limited to any one or more of the following.

The optical apparatus may comprise an optical intensity modulator configured to: receive any one or more of the first and second pulses output from the first optical intensity modulator for transmission; and, independently change the intensity of subsequent received pulses; output any one or more of the first and second pulses for transmission to the further optical apparatus.

The optical apparatus may be configured such that the optical intensity modulator comprises: at least two optical output paths, and, at least one phase modulator associated with one of the output paths configured to change the phase of an optical pulse propagating along the said output path.

The optical apparatus may be configured such that: the phase modulator configured to change the phase of at least one of the first or second light pulses output from the optical apparatus is a first phase modulator; and, phase modulator of the second optical intensity modulator is a second phase modulator.

The optical apparatus may be configured such that the optical intensity modulator comprises two output optical paths and is configured to: receive, as an input, at least one of the first or second pulses, split each said pulse into two sub pulses, interfere the said sub pulses at a combiner; and, output the interfered pulse along at least one of the two optical output paths.

The optical apparatus may be configured such that the optical intensity controller comprises: at least two input optical paths; and, at least two intermediate optical arms; at least one arm being associated with a phase modulator configured to change the phase of pulses propagating along the arm; and, at least one output optical paths wherein one of the at least one output optical path is used to output the said pulses for transmission; the first optical modulator configured to receive any of the input first or second pulses, split each said pulse into two sub pulses and interfere the said sub pulses for output along at least one output optical path.

The optical apparatus may further comprise an optical pulse source configured to input pulses to the optical splitter.

The optical apparatus may be configured such that the pulse source comprises: a light source; and, a source optical modulator configured to receive light from the light source and output light pulses to the optical splitter.

The optical apparatus may be configured such that the first phase modulator is associated with one of the first or second optical paths and is configured to change the phase of an optical pulse propagating along the said path.

The optical apparatus may be configured such that any one or more of the splitter, first optical path, second optical path, first optical modulator, second optical modulator, third optical modulator and light source comprises an integrated optic component. According to a second aspect of the present invention there is provided an optical apparatus for outputting light to a first and second optical detector for generating a quantum cryptographic key from light pulses received from a further optical apparatus; the quantum cryptographic key generated according to at least one quantum cryptography technique; the quantum cryptography technique at least comparing the phase difference between at least two light pulses; the optical apparatus comprising: a controllable integrated optical splitter configured to receive at least a first and a second light pulse and control the output intensity of each said pulse between a first and a second output optical path; the first output optical path configured to be in optical communication with the first optical detector; and, an integrated optical element configured to: receive at least a portion of the said first and second optical pulses from the second output optical path of the controllable optical splitter; split each said received pulse into: a third light pulse propagating along a first integrated optical path; and, a fourth light pulse propagating along a second integrated optical path, wherein the second integrated optical path comprises an optical path length that: is longer than the first integrated optical path; and, temporally separates the third and fourth optical pulses; and, a phase modulator configured to controllably change the phase of at least one of the third or fourth light pulses propagating along the corresponding first or second integrated optical paths; and, an integrated optical combiner configured to: receive the temporally separated third and fourth light pulses from the respective first and second integrated optical paths; and, interfere the fourth light pulse split from the first light pulse with the third light pulse split from the second light pulse; output the combined pulses to the second optical detector.

The second aspect may be modified in any suitable way as disclosed herein including but not limited to any one or more of the following.

The optical apparatus may be configured such that the controllable integrated optical splitter comprises an integrated optical interferometer comprising: a first optical input path; a second optical input path the first and second input optical paths configured to receive any of the first and second pulses; at least two interferometer arms; an optical combiner configured to receive input from the input paths and divide light into the arms; an optical combiner configured to receive input from the arms and output light into the first and second output optical paths; at least one phase modulator associated with one arm and configured to controllably impart a phase change to pulses propagating along the said arm to change the output intensity of each said pulse between the first and second output optical paths.

The optical apparatus may be configured such that the integrated optical element comprises an integrated optical intensity controller configured to control the relative intensities of the third and fourth light pulses output from the controller.

The optical apparatus may be configured such that the integrated optical intensity controller comprises an integrated optical interferometer comprising: an optical input path for receiving optical pulses from the controllable integrated optical splitter; at least two interferometer arms, at least one phase modulator associated with one arm and configured to controllably impart a phase change to pulses propagating along the said arm to change the relative output intensities of the third and fourth pulses output from the splitter.

According to a third aspect of the present invention there is provided an optical apparatus for generating a quantum cryptographic key by encoding and decoding a sequence of light pulses; the quantum cryptographic key generated according to at least one quantum cryptography technique; the quantum cryptography technique at least comparing the phase difference between at least two light pulses; the optical apparatus being configured to: receive input light pulses from an optical source, encode a sequence of said light pulses and transmit the encoded sequence of light pulses to a further optical apparatus; receive an encoded sequence of light pulses from the further optical apparatus, process the said pulses and output the processed pulses to a first and a second optical detector for decoding; the apparatus comprising: a first and a second integrated optical path, the second path having a optical path length longer than the first integrated optical path; and, a first integrated optical element in optical communication with the first and second integrated optical paths and the second optical detector, and, an integrated optical intensity controller in optical communication with the first and second integrated optical paths; and, a second integrated optical element in optical communication with the integrated optical intensity controller and the first optical detector; a phase modulator configured to controllably change the phase of light pulses propagating along at least one of the first or second integrated optical paths; wherein: the first integrated optical element is configured to: optically combine pulses of the encoded pulse sequence output from the first and second integrated optical paths; and, output at least a portion of the said combined pulses sequence to the second optical detector; receive light pulses from the optical source and split each said pulse into first and second light pulses propagating along first and second integrated optical paths respectively; the integrated optical intensity controller is configured to: receive at least a portion of the encoded light pulses output from the second integrated optical element and control the relative intensities of the received light pulses output from the controller into the first and second integrated optical paths; and, receive the first and second light pulses from the first and second integrated optical paths; and control the relative intensities of the first and second light pulses output from the controller; the second integrated optical element configured to: receive the encoded pulse sequence from the further optical apparatus; and, control the output intensity of each said received pulse between: a first output in optical communication with the first detector; and, a second output path in optical communication with the integrated optical intensity controller; receive light pulses output from the integrated optical intensity controller and output said received pulses for transmission to the further optical apparatus.

The third aspect may be modified in any suitable way as disclosed herein including but not limited to any one or more of the following.

The optical apparatus may be configured such that the second integrated optical element is configured to: receive any one or more of the first and second pulses output from the first optical intensity modulator for transmission; and, independently change the intensity of subsequent received pulses; and, output the any one or more of the first and second pulses for transmission to the further optical apparatus.

The optical apparatus may be configured such that the second integrated optical element comprises: at least two optical paths configured to output and receive light pulses to and from the further optical apparatus, and, at least one phase modulator associated with one of the said paths, the said phase modulator being configured to change the phase of an optical pulse propagating along the said path.

The optical apparatus may be configured such that the second integrated optical element comprises an integrated optic Mach-Zehnder interferometer.

The optical apparatus may be configured such that integrated optical intensity controller comprises an integrated optic Mach-Zehnder interferometer.

The optical apparatus may further comprise an optical pulse source configured to input pulses to the optical splitter.

The optical apparatus may be configured such that the pulse source comprises: a light source; and, an integrated optical modulator configured to receive light from the light source and output light pulses to the first integrated optical element.

The optical apparatus may be configured such that the pulse source integrated optical modulator comprises an integrated optic Mach-Zehnder interferometer configured to receive light from the from the first integrated optical element and output the light to the second optical detector.

The optical apparatus may further comprise at least one of the first and second optical detectors.

According to a fourth aspect of the present invention there is provided a system for generating a quantum cryptographic key comprising a first optical apparatus as described in the first and third aspects, in optical communication with a second optical apparatus as described in the second and third aspects.

The fourth aspect may be modified in any suitable way as disclosed herein.

According to a fifth aspect of the present invention there is provided a method for transmitting light pulses to a further optical apparatus for generating a quantum cryptographic key using the optical apparatus as described in the first and third aspects, the method comprising the steps of: controlling the relative intensities of the first and second light pulses output from the controller for transmission to the further optical apparatus; changing the phase of at least one of the first or second light pulses output from the optical apparatus using the phase modulator.

The fifth aspect may be modified in any suitable way as disclosed herein including but not limited to any one or more of the following.

The method may further comprise the step of: controlling the relative intensities of the first and second light pulses output from the controller.

According to a sixth aspect of the present invention there is provided a method for processing light pulses received from a further optical apparatus for generating a quantum cryptographic key, the method using the optical apparatus as described in the second and third aspects and comprises the steps of: receiving pulses from the further optical apparatus; controlling the output intensity of each said received pulse between: a first optical path in optical communication with the first detector; and, a second output path in optical communication with the integrated optical intensity controller; controllably changing the phase of light pulses propagating along at least one of the first or second integrated optical paths;

The sixth aspect may be modified in any suitable way as disclosed herein including but not limited to any one or more of the following.

The method may further comprise the step of: controlling the relative intensities of the light pulses output from the controller into the first and second integrated optical paths.

Embodiments of the present invention will now be described in detail with reference to the accompanying drawings, in which:

FIG. 2b shows a plan view of the waveguide of FIG. 2a;

FIGS. 6b and 6c show alternative examples of a transmitting apparatus as shown in FIG. 6a;

Figure 1:
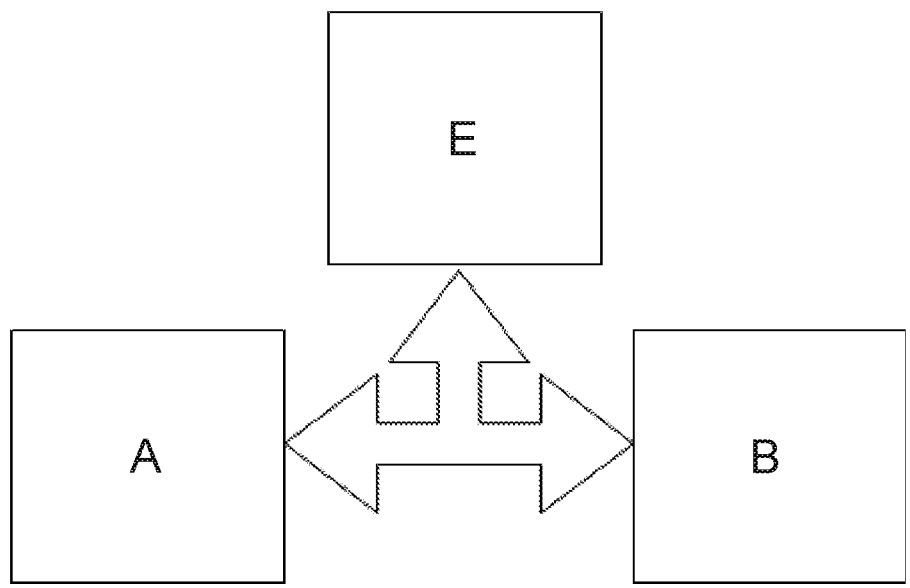
FIG. 1 shows a block diagram of a communication between parties A and B, with adversary E.

As used throughout the present disclosure, the term 'a' and 'the' include the plural form unless the context clearly dictates otherwise. The term 'comprising' is intended to mean 'includes but not limited to' unless the context clearly dictates otherwise. The terms 'coupled' or 'linked' or 'in communication with' does not exclude the presence of intermediate elements between the coupled or linked or communicating items.

Throughout this disclosure, reference may be made to input and output ports when discussing a particular optical feature or component. These 'ports' are to be interpreted as the inputs and outputs of that optical feature or component.

An optical apparatus 2 is presented for transmitting light pulses to a further optical apparatus 4 for generating a quantum cryptographic key wherein the quantum cryptographic key generated according to at least one quantum cryptography technique; the quantum cryptography technique at least comparing the phase difference between at least two light pulses. This apparatus 2 may also be referred to throughout as an optical transmitter apparatus 2.

An optical apparatus 4 is also presented for outputting light to at least a first 202 and second 204 optical detector for generating a quantum cryptographic key from light pulses received from a further optical apparatus 2; the quantum cryptographic key generated according to at least one quantum cryptography technique; the quantum cryptography technique at least comparing the phase difference between at least two light pulses. This apparatus 4 may also be referred to throughout as an optical receiver apparatus 4.

The detectors 202, 204, 205 used in the apparatus 4,6 described herein may be any one or more detector devices in principle that can detect single photons by converting the photon energy into electrical energy that can be monitored by electrical monitoring equipment. The detectors 202, 204, 205 preferably comprise a semiconductor material used to absorb the photons, for example Indium Gallium Arsenide (InGaAs). The detectors 202, 204, 205 are preferably able to detect photons at GHz pulse rates and can absorb the wavelengths of the light used by the sources described herein (for example the C-band wavelength spectrum). Examples of photon detectors include InGaAs avalanche photodiodes with gated operation and self-differencing scheme, or niobium nitride superconducting nanowire single photon detectors.

An optical apparatus 6 is also presented for generating a quantum cryptographic key, the quantum cryptographic key generated according to at least one quantum cryptography technique; the quantum cryptography technique at least comparing the phase difference between at least two light pulses. This apparatus may also be referred to throughout as an optical transceiver apparatus 6.

FIG. 1 shows a block diagram exemplifying the principle parties used to describe a cryptographic system. The sender or transmitting party A (or 'Alice'), the receiving party B (or 'Bob') and an unwanted eavesdropper E (or 'Eve'). In the present application, unless otherwise stipulated, the transmitter apparatus 2 is Alice, the receiver apparatus 4 is Bob and the transceiver apparatus 6 can be both Alice and/or Bob. To securely communicate with each other, Alice and Bob take steps to set up a secret key between each other that is used to encode the data they wish to transmit to each other.

The optical transceiver 6, optical transmitter 2 and optical receiver 4 apparatus are formed using at least one photonic integrated circuit. In principle, any of the features of the different optical apparatus described herein may be formed from a photonic integrated circuit. A photonic integrated circuit used by the examples shown herein may in principle be any photonic integrated circuit, including but not limited to a monolithic and/or hybrid integrated circuit. Preferably the photonic integrated circuit is formed from one or more integrated optic waveguides. The waveguides may be used to form the different components described herein and couple and propagate light from one component to another. In principle any integrated optic waveguide cross section design and/or geometry may be used including, but not limited to, buried channel, rib or ridge waveguides. In principle the integrated optic waveguides may be formed from any combination of materials with refractive indices enabling the propagation of guided modes within the circuit. Preferably such materials include, but are not limited to, semiconductors and/or dielectrics. Preferably at least one of the materials is an active material configured to change one of is optical properties (such as refractive index) upon an input stimuli such as, but not limited to, current electrical injection or an applied electric field. Preferably the core of the waveguides comprise at least one of these active materials. Controllably inducing changes in refractive indices in waveguiding materials allows the modes propagating along such waveguides to be subject to a phase change.

Having active materials, such as semiconductors, to form the waveguide circuitry allows for the passive and active portions of the same circuit to be manufactured in the same or similar processing steps. Preferred materials for the core waveguide are any of Indium Phosphide (InP), Silicon (Si), Silicon Oxynitride ($SiON_x$), Lithium Niobate (LNb), Gallium Arsenide (GaAs). More preferably the material of the core is made from InP because InP is suitable for forming integrated components such as laser sources, intensity modulators and phase modulators.

Figure 2A:
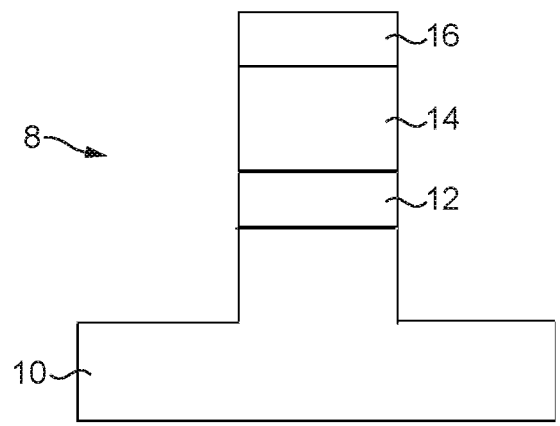
FIG. 2a shows an example of a cross section of an integrated optical waveguide component.
Figure 2B:
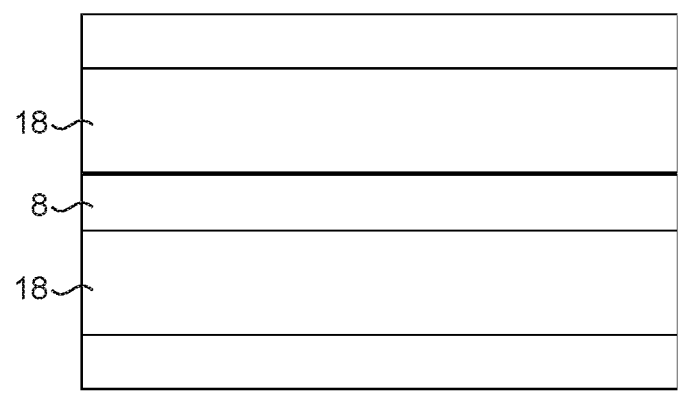

FIGS. 2a and 2b shows the cross section of an example of a rib waveguide 8 that may be used with the apparatus 2, 4, 6 described herein.

FIG. 2a shows the cross section of an example passive waveguide 8 that may be used with the apparatus 2, 4, 6 described herein. Preferably an n-doped Indium phosphide material provides a substrate 10 for an intrinsic InP core 12 (preferably as a multi-quantum well structure providing enhanced electro-optic phase tuning where required), with an overcladding of p-doped InP, patterned to form a waveguide 8 using lithographic techniques. The core 12 depth may be between 0.2-0.5 µm, more preferably between 0.3-0.4 µm, more preferably around 0.35 µm. In each preferred range of core cross sectional dimensions, the waveguide 8 (comprising the core 12) is preferred to guide only one mode per orthogonal polarisation (TE or TM). More preferably only one polarisation is guided, for example the TE polarisation. The core 12 is preferably bordered on its upper surface (opposite the substrate undercladding) by a first overcladding layer 14 of p-InP. The preferred depth of this layer 14 may be between 1-3 µm, more preferably 2 µm.

The first overcladding layer 14 is preferably bordered on its upper surface (opposite the core 12) by a second overcladding layer 16 of p-InGaAs. The preferred depth of this layer 16 may be between 0.25-0.75 µm, more preferably 5 µm.

The waveguide 8 is preferably formed by etching parallel trenches 18 either side of the desired waveguide rib 8, leaving the majority of the wafer area un-etched as shown in FIG. 2b. Preferably the width of the waveguide 8 is greater than or equal to 1 µm to support single mode operation. Width values greater than 1 µm may be used to incur lower loss. In principle the waveguide 8 may support more than one optical mode. A preferred etched region 18 width is greater than 2 µm, preferably greater than 5 µm, preferably 10 µm. The depth of the etched region 18 is preferably between 2-8 µm, more preferably between 3-5 µm, more preferably 4 µm Protocols Quantum cryptographic techniques use at least one basis, wherein each basis defines at least two data values transmitted between Alice and Bob to set up the secret key. Therefore, the bases used by the transmitter 2, receiver 4 and transceiver 6 apparatus to generate the key may arise from using different quantum cryptographic protocols. Each protocol uses at least one basis. Each basis has at least two data values wherein each data value is derived by comparing two spatially or time separated light pulses. Each pulse is allocated to a pulse 'bin' 20; wherein different pulse bins 20 are either separated in time (for example one bin being sent after another bin) and/or space (for example one bin 20 being sent in a different spatial path to the other bin 20). In some protocols the data value of the bases are derived from the presence of one pulse in one bin 20 and no pulse 20 in another bin.

For the purposes of describing the apparatus 2, 4, 6 herein, one may also define the pulses in each bin 20 as pulse states that can have zero intensity (for no pulse) and non-zero intensity (for at least one photon). The pulses states transmitted and received by the apparatus 2, 4, 6 typically have mean photon numbers (µ) less than 1. At least for weak coherent sources, such as an attenuated laser, a pulse state cannot be guaranteed to have one photon, no photons or multiple photons until a measurement is made. The protocols described herein therefore aim to maximise the possibility of creating a single photon pulse or a zero photon pulse by configuring the apparatus to provide an appropriate extinction ratio between the two intended outputs. The extinction ratio between a non-zero photon pulse and a zero photon pulse is preferably >10 dB, more preferably, >20 dB.

Some protocols such as BB84 use separate sets of two pulses to define the data value in each basis, whereas some protocols, such as DPS, may use the same pulse to help define two different data values in the same basis.

The set of pulses states for each data value are sent by the transmitter apparatus 2 and subsequently received by a receiver apparatus 4. The receiver apparatus 4 compares the set of two pulse states defining the data value and outputs an optical state that corresponds to the data value. The set of pulse states for each data value are configured such that, when compared and decoded into an output state, the optical output state of the data values are orthogonal eigenstates.

The optical states in each data value of each basis differ from each other by at least one optical degree of freedom (i.e. a degree of freedom in the properties of the optical pulse). In the apparatus 2, 4, 6 described herein the optical degrees of freedom at least include the relative phase between the pulses and/or which time bins 20 zero and non-zero intensity pulses states are sent in. A 'time bin' 20 is a relative timing difference between the transmission of the pulses in the same set along the same optical path. The time bins 20 are sufficiently far apart from each other in time so that the pulses do not overlap when propagated along the same optical path. In other protocols such as RFI, the different spatial mode of the pulses may be used to define the protocol (i.e. the pulses states are sent over different optical communication channels).

When setting up a quantum key, Alice sends Bob a sequence of optical pulses in accordance with a particular protocol. Bob receives the pulses and measures them in accordance with the same protocol. Typically, and desirably the non-zero pulses states sent by Alice have a low mean photon number below one, such that the chance of Alice sending pulses with multiple photons is low to negligible. The ability to send single photon pulses is important in QKD because multiple photon pulses can weaken the security of the key when using weak coherent sources. For weak coherent sources (such as an attenuated laser) mean photon of less than 0.1 are usually used to eliminate multiphoton terms. Other optical sources may be used such as quantum dot sources which more reliably emit single photon pulses and do not suffer from multiple photon terms, therefore may have higher mean photon numbers such as µ less than 1. Once Bob has performed a measurement on the pulses sent by Alice, Alice and Bob communicate through a classical channel to establish which bits of Alice's initially transmitted data are to be used to generate the quantum key. Often this requires sending a subset of the data values measured by Bob. The further steps in creating the quantum key shared between Alice and Bob may be according to any suitable technique selecting which of received data values to use to set-up the key. This can include but not be limited to error estimation, error correction or reconciliation, and privacy amplification to ensure security.

In certain protocols, for example BB84, multiple bases are used to define the data values, such as data values of 0 and 1 using a first basis and data values of 0 and 1 using another basis. Each basis has its own way of encoding the data values 0 and 1 using one or more pulses, for example in BB84, some bases use the phase difference between two sequential non-zero intensity pulses to define the data values of 0 and 1 whilst another basis uses the relative order of sending a zero intensity and a non-zero intensity pulse define the data values of 0 and 1. In a typical implementation of BB84, Alice will send data using a random selection of either basis for each data value sent. Bob can typically only measure sets of pulses according to one of the bases at any time. Therefore, because Bob does not know which basis to correctly measure in, Bob may measure sets of pulses correctly or incorrectly. In BB84, when Bob uses the correct basis to measure the data values from 2 pulse states, the output optical state signifying the data value (if sent back to Alice) will be in accordance with the known data value sent by Alice. If however Bob uses the wrong basis to measure the pulse states then the output optical state will be random. The correct and incorrect measurement bases used by Bob form part of the procedure used to generate the key and establish the presence of eavesdroppers.

FIGS. 3a-3e show schematic examples of how the BB84, COW, DPS and RFI protocols may be implemented using the apparatus 2, 4, 6 and methods described herein. For the BB84, COW and DPS protocols, the optical pulses sent to Bob are turned into data values (that can be used to define a quantum key) by splitting each incoming pulse state into two sub-pulse states, delaying the sub pulse states by a time delay substantially similar (preferably identical) to the time delay between the $1^{st}$ and $2^{nd}$ time bins 20 sent by Alice, and recombining the sub pulse states. The pulse therefore gets split into a long and a short optical paths each carrying sub pulse states wherein the paths come back into proximity (or join) and interfere sub pulses propagating along the paths. The result of doing this for the pulse states in both of the time bins 20 sent by Alice is three measurement time bins 22 associated with two subsequently transmitted time bins 20 as exemplified on the right hand side of FIG. 3a. The data value can be ascertained by examining the three measured time bins 22.

Figure 3A:
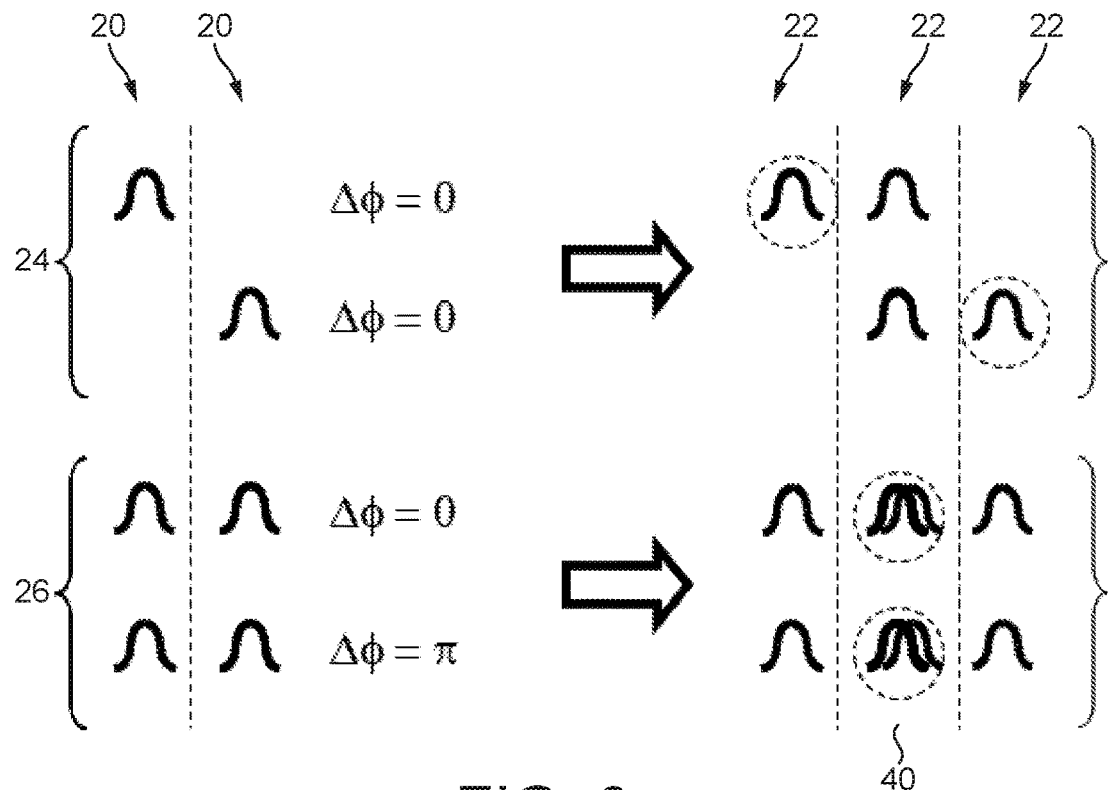
FIG. 3a shows a schematic example of an implementation of the BB84 protocol.
Figure 3B:
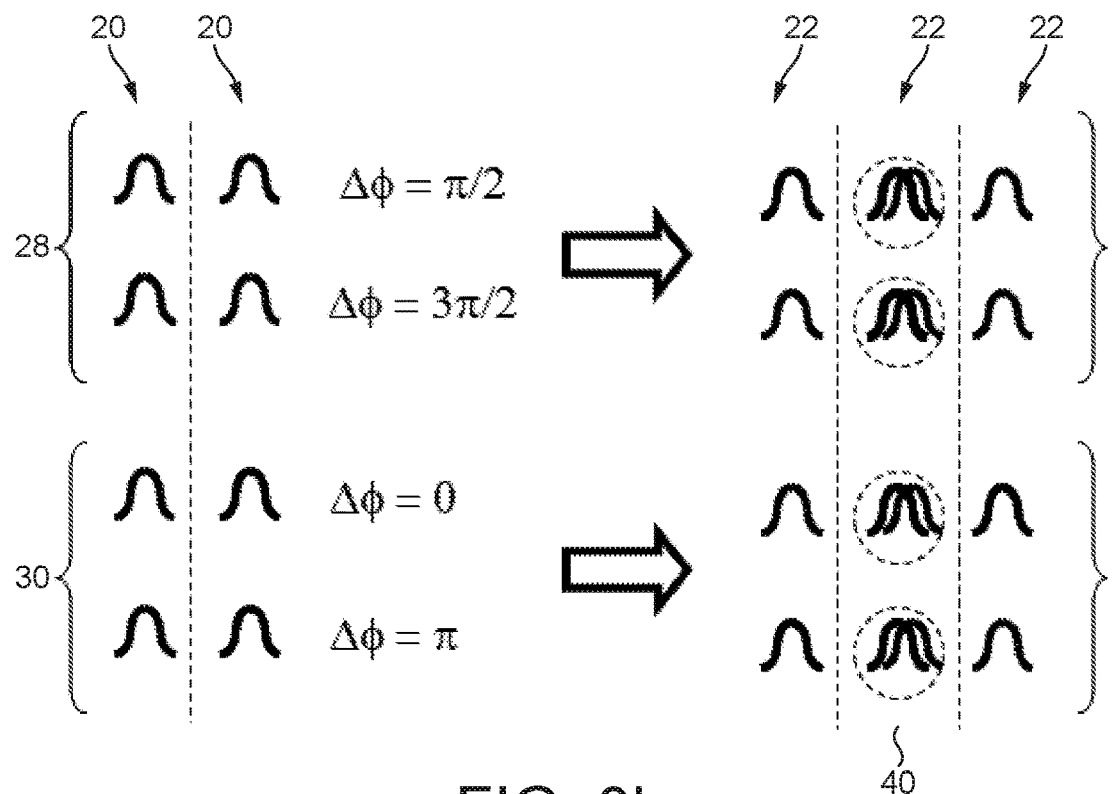
FIG. 3b shows a schematic example of an implementation of the BB84 protocol using alternate bases.

FIGS. 3a and 3b show two examples of an implementation of the BB84 protocol used with the apparatus 2, 4, 6 disclosed herein. FIG. 3a shows a first method to implement the BB84 protocol. The first method has two bases 24, 26. The first basis 24 (shown in the top set of brackets) is formed from two data values wherein the pulses states defining the first data value are a zero intensity pulse state in a first time bin 20 and a non-zero intensity pulse state in a second time bin 20. The other data value has a non-zero intensity pulse in a first time bin 20 and a zero intensity pulse in a second time 20. Upon receiving the time bins 20, the data value is determined by the presence of a non-zero intensity pulse state in the first of last measured time bin 22.

The second basis 26 (shown in the bottom set of brackets) has both of the data values defined by having non-zero intensity pulses in first and second time bins 20. Preferably the pulses defining each data value have identical intensities, more preferably a single photon shared between each time bin. One set of two pulses defining the first data value has a relative phase difference of zero between the two time bin separated pulses whereas the set of two pulses defining the second data value has a relative phase difference of $\pi$. Upon receiving the time bins 20, the data value is determined by the interference 40 of the pulse states in the middle measured time bin 22.

FIG. 3b shows another method of implementing the BB84 protocol. In this implementation, both bases 28, 30 use sets of two non-zero intensity pulse states to define each data value. The phase differences between the pulse states of the different data values are different. For each basis 28, 30, the phase difference between the pulses corresponding to one data value is offset by a phase difference of it from the phase difference between the pulses corresponding to the other data value of the same basis 28, 30. Furthermore each basis 28, 30 uses different pulses state phase differences to define its data values. For example in FIG. 3b: the first data value of the first basis 28 (in the top set of brackets) uses pulse states with a $\pi/2$ phase difference; the second data value of the first basis 28 uses pulse states with a $3\pi/2$ phase difference (hence the phase differences used differ by $\pi$ to define the data values); the first data value of the second basis 30 uses pulse states with a zero phase difference; the second data value of the second basis 30 uses pulse states with a it phase difference to define the data values. In a similar manor to the bottom most basis 26 shown in FIG. 3a, upon receiving the time bins 20, the data values are determined by the interference 40 of the pulse states in the middle measured time bin 22.

The receiving apparatus 4 deriving data values for the FIG. 3b implementation changes the basis measurement by applying 0 or a $\pi/2$ phase delay along one of the arms that the sub pulses travels. If a zero phase delay is used then the basis 30 in the bottom set of brackets will yield a deterministic difference in the optical output of the apparatus 4 when the different pulse sets are interfered 40.

Conversely, if the same phase delay is used to measure a pulse set from the basis 28 in the top most brackets then the output optical states from interfering 40 the pulse sets will not yield a predetermined output optical state, but a random optical output state and cannot yield a secure key Both of these implementations of the BB84 protocol shown in FIGS. 3a and 3b require a time delay between the sending of subsequent sets of pulses states in a transmission so that when measured by the receiver apparatus 4, the first pulse of one set of pulses states does not get incorrectly compared to the last pulse of the previous set of pulse states transmitted along the optical channel.

Figure 3C:
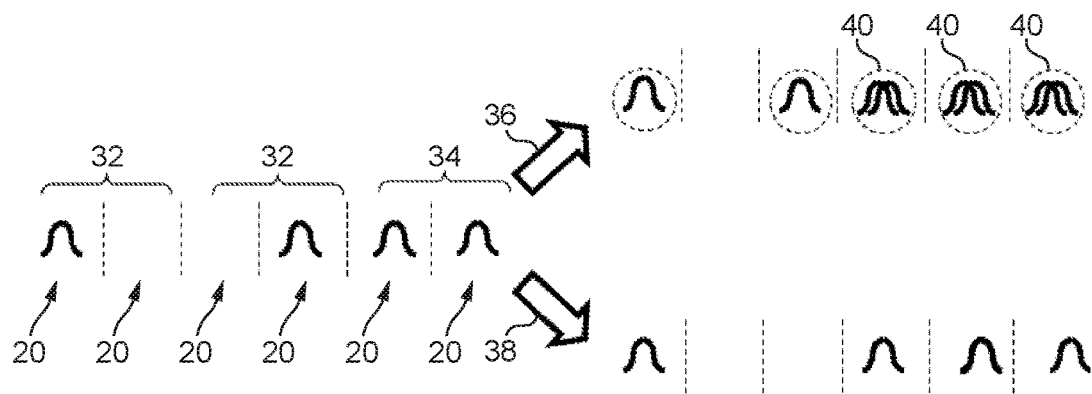
FIG. 3c shows a schematic example of an implementation of the COW protocol.

FIG. 3c shows an example of an implementation of the COW protocol used with the apparatus 2, 4, 6 disclosed herein. The COW protocol, uses a single basis 32 and a decoy state 34. The single basis 32 is formed from two data values wherein the pulse states defining the first data value are a zero intensity pulse in a first time bin 20 and a non-zero intensity pulse in a second time bin 20 following the first time bin 20. The other data value has a non-zero intensity pulse in the first time bin 20 and a zero intensity pulse in the second time bin 20. The decoy state 34 has a non-zero intensity pulse in the first and second time bin 20. The decoy state 34 is used to increase the likelihood of creating successive photon pulses used to estimate the security of the optical communication channel.

The receiving device splits the optical path (upon which the incoming pulses are propagating) into two spatially separate optical paths, 36, 38. The pulses (typically having $\mu<1$ therefore typically have either one or zero photons per pulse. The photon therefore either goes along one of the two paths 36, 38. One of the paths 38 terminates in a detector that determines the time of arrival of the photons. The data values for the key are derived from this timing information. Alternatively when the photon is split into the other optical path 36, it is used to determine the security of the channel by detecting any phase changes between consecutive time bins 20. Security of the channel is confirmed by measuring a consistent relative phase between successive pulses. The measurement is typically achieved using an unbalanced interferometer (such as a Mach Zehnder) where the superposition state of a time bin 20 is interfered 40 with an adjacent time bin 20, wherein each bin 20 is transmitted to intentionally have a photon in the pulse. Typically a pulse transmitted to have a non-zero number of photons may have $\mu > 0.0001$. As stated previously, the extinction ration between a non-zero photon pulse and a zero photon pulse is preferably >10 dB, more preferably, >20 dB.

Figure 3D:
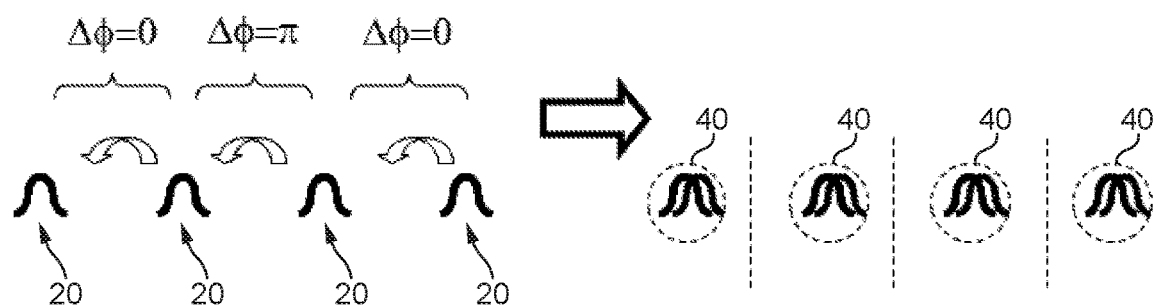
FIG. 3d shows a schematic example of an implementation of the DPS protocol.

FIG. 3d shows an example of an implementation of the DPS protocol used with the apparatus 2, 4, 6 disclosed herein. The DPS protocol uses the relative phase difference between two consecutive pulses in consecutive time bins 20 transmitted along the same channel. Unlike the BB84 which requires a delay between sending subsequent sets of pulses states, DPS uses the phase difference between each successive pulse in a train of non-zero intensity pulse states. FIG. 3d shows a single basis being used with two different data values corresponding to phase differences 0 and $\pi$ between successive pulses.

In a similar manner to the top set of brackets in FIG. 3a, the data values are derived from examining the interference 40 of the a) sub pulse of a first time bin 20 that got split and followed the long optical path and b) sub pulse of a subsequent second time bin 20 that got split and followed the short optical path.

Figure 3E:
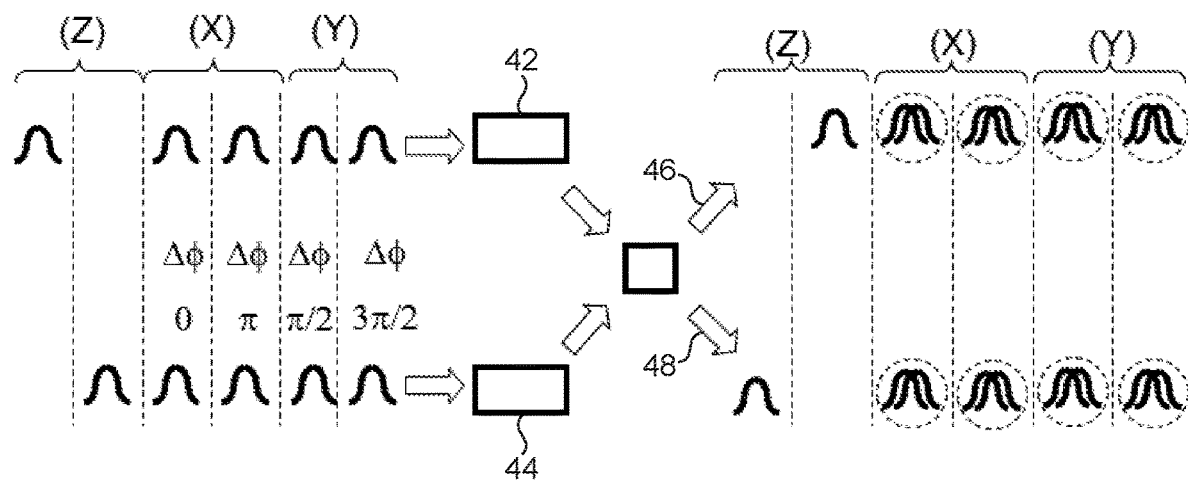
FIG. 3e shows a schematic example of an implantation of the RFI protocol.

FIG. 3e shows an example of an implementation of the RFI protocol used with the apparatus 2, 4, 6 disclosed herein. The RFI protocol uses multiple bases, preferably three, where the pulse states defining each data value are transmitted over spatially separate optical transmission channels 42, 44 wherein each pulse state comprises a non-zero intensity pulse. The RFI protocol uses one agreed upon and aligned basis set to define its secure key (labelled Z in FIG. 3e) and utilises the other two bases (labelled X and Y in FIG. 3e) to determine the security of the channel. This protocol allows for the pulses sent over the different channels 42 and 44 to be slowly deviating and non-aligned.

In the apparatus 2, 4, 6 disclosed herein the agreed upon basis Z includes two data values, the first consisting of a non-zero signal pulse in the top transmission channel 42, and the second data value consisting of a non-zero signal pulse in the bottom transmission channel 44. The other two bases (X and Y) utilise the presence of non-zero signal pulses in the top and bottom transmission channel 42, 44 and phase differences between the pulses in each channel to define the data value. Phases of 0 and $\pi$ are used for the second basis X, and $\pi/2$ and $3\pi/2$ for the third basis Y, although other combinations can be used. Measurement of X and Y bases is achieved by interfering the two optical channels 42, 44 and detecting single photons at two spatially separated outputs 46, 48 representing the 2 data values in each basis. Measurement of the Z basis is achieved using the same technique where the detection of a photon in one of the outputs indicates the presence of a photon propagating along a particular input channel. For example when using a balanced Mach-Zehnder interferometer to interfere the two input channels 42, 44 and measuring according to the Z basis, detecting a photon in the top output 46 but not the bottom output 48 indicates a photon being sent along bottom transmission channel 44, hence defining a particular data value.

Imperfections on the channels 42, 44 can cause changes in the relative phase of these top and bottom communication channels 42, 44 which may cause errors in other protocols, but if both X and Y bases are used in the RFI protocol to assess the security of the communication channel, a bound on the adversary's (Eve's) knowledge can still be obtained.

Throughout all of the protocols used by the apparatus 2, 4, 6 described herein the transmitter 2 or transceiver 6 apparatus is preferably configured to output non zero pulses states have mean photon numbers $\mu <= 1$ photons per pulse state; preferably $\mu < 0.5$ photons per pulse state; more preferably $\mu < 0.2$ photons per pulse state; even more preferably $\mu < 0.1$ photons per pulse state. The less the probability is of multiple photons being output in any pulse, the less likely an eaves dropper will be able to crack the quantum key. With such a low value of mean photon no./pulse, some intended non-zero intensity states may not arrive at the receiver apparatus with any photons. This may arise via a number of physical phenomena including optical losses in the transmitting apparatus 2, optical losses in the optical transmission channel between the transmitting 2 and receiver 4 apparatus and optical losses in the receiving apparatus 4. This issue is often overcome by transmitting a large amount of sets of the pulse states to generate the quantum key so that even when optical losses and the inherent data selection process takes place there are enough bits of data to generate an acceptable quantum key. To increase the probability of successful transmission, higher mean photon numbers can be used and still maintain security if multiple intensities are randomly chosen for each state. This is known as decoy state encoding.

The wavelength range of operation (i.e. the wavelengths of the pulse states sent by the transmitter 2 and received by the receiver 4 apparatus) can be any wavelength range in principle. Preferably the wavelength range is between 1260 nm and 1675 nm (DWDM telecommunication band), more preferably between 1530 nm and 1565 nm (C-Band).

The apparatus 2, 4, 6 described herein may be used for any Quantum key distribution system, however is preferably used for point to point quantum communication along at least one optical fibre, within networks desiring multiple protocols and reconfigurable operation, as well as use in the home and with personal and portable devices to secure classical data communication or further cryptographic activities.

Transmitter Apparatus

There is presented herein, as a first aspect, an optical apparatus 2 for transmitting light pulses to a further optical apparatus 4 for generating a quantum cryptographic key according to at least one quantum cryptography technique; the quantum cryptography technique at least comparing the phase difference between at least two light pulses. This apparatus 2 may be termed a transmitter apparatus 2 throughout.

The apparatus 2 may be configurable to output at least two pulses. Preferably, the apparatus 2 is configured to output one or more pulses states according to at least one basis, preferably at least two bases used in quantum cryptography protocols. Preferably the apparatus 2 is configured to output a sequence of pulses or pulse states that correspond to at least one, preferably more than one, quantum cryptographic protocol.

Figure 4A:
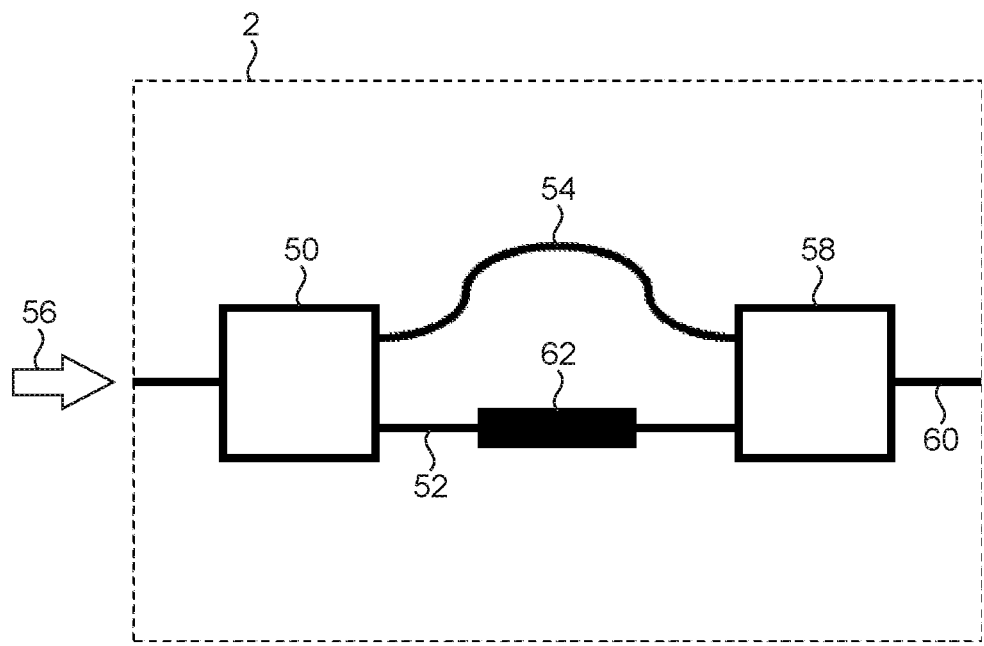
FIGS. 4a and 4b shows examples of alternative configurations of a transmitting optical apparatus as presented herein.
Figure 4B:
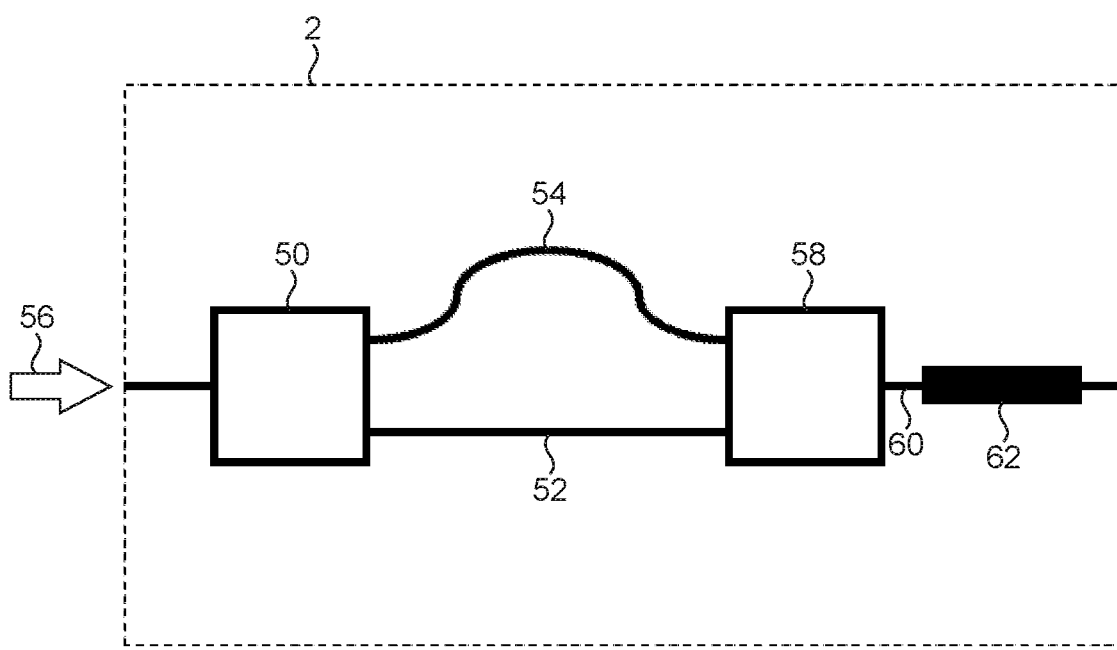

FIGS. 4a and 4b show block diagram examples of such an optical apparatus 2.

Figure 5A:
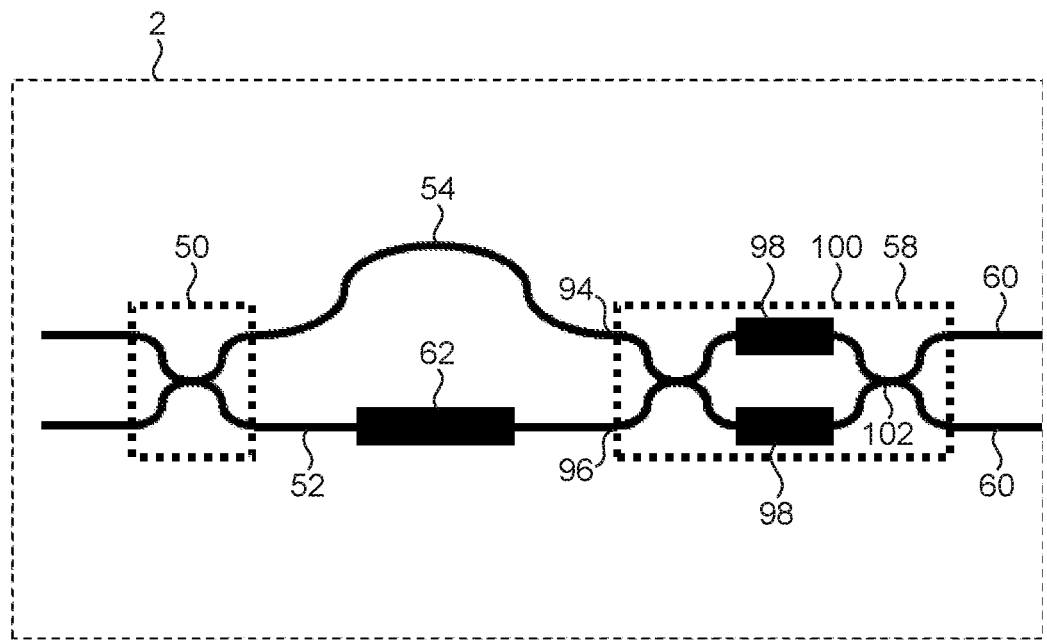
FIGS. 5a and 5b show examples of alternative configurations of a transmitting optical apparatus as presented herein.
Figure 5B:
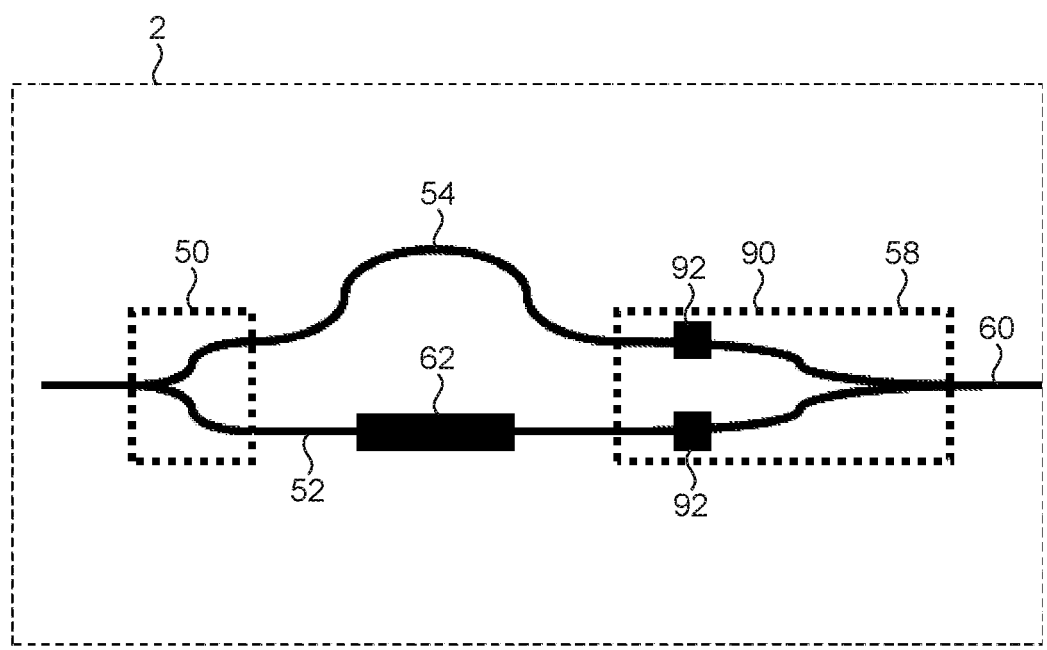

The optical transmitter 2 comprises an integrated optical splitter 50 configured to receive at least one input light pulse and split the input light pulse into a first light pulse propagating along a first integrated optical path 52 and a second light pulse propagating along a second integrated optical path 54. The second optical path 54 comprises an optical path length that is longer than the first optical path 52 and temporally separates the first and second light pulses. The optical path length difference between the two optical paths 52, 54 is preferably less than the coherence length of the optical source used to generate the light pulses. The integrated optical splitter 50 may in principle be any optical splitter 50 including, but not limited to a Directional Coupler (DC), a Multi-Mode Interference (MMI) coupler or a Y branch. FIG. 5a shows an example of the optical splitter 50 being a 2×2 coupler such as a DC or MMI whilst FIG. 5b shows an example of the splitter 50 being a Y-branch.

The input pulses received by the splitter 50 may be generated from an optical source 56 that is part of the transmitter apparatus 2 or separate to the transmitter apparatus 2. FIGS. 4a and 4b show an arrow indicating the input into the optical splitter 50 from the optical source 56. The optical source 56 can be any optical source 56 in principle, but preferably one that has a coherence time at least as long as the delay between the first and second light pulse output from the first 52 and second 54 optical paths from the path length imbalance. Preferably the source 56 comprises a temporally modulated laser source. The laser source may be any laser source in principle. The laser source may comprise a directly modulated laser source that outputs pulses or the optical source 56 may comprise a continuous wave (CW) source with its output modulated into pulses by a separate modulating element. Preferably the source is a CW source with external modulation to provide a stable phase relationship between subsequent pulses and higher modulation rates. This could also be achieved with a pulsed-laser source. The optical source 56 is preferably tunable so that the output wavelength can be changed. The source 56 preferably comprises a wavelength tunable CW laser source with an external pulse modulator that outputs pulses at the repetition rates required by the apparatus disclosed herein.

The input pulses may be a train of pulses output arbitrarily, for example by a random modulation pattern.

The input pulses received by splitter 50 are preferably a train of input pulses (not shown). Preferably the input train is a train of non-zero intensity pulse states wherein each pulse has substantially the same intensity. By having a train of equal intensity pulses input to the optical splitter, the optical transmitter apparatus 2 can utilise its other components to selectively modify any one or more of the timing, relative phase, or photon intensity of the pulses in the train that are output from the apparatus 2. The train of pulses may have any pulse repetition frequency in principle, preferably in integer steps of the relative delay in optical path between the first 52 and second 54 paths, e.g. if the path length difference is 300 ps, COW and DPS require 300 ps periodicity, whereas BB84 will benefit from 900 ps repetition.

Preferably the pulses received by the splitter 50 have a pulse Full Width Half Maximum (FWHM) of less than half of the relative delay from the optical path length difference between the first 52 and second 54 optical paths. Preferably, if this relative delay is 300 ps (26 mm in standard InP waveguides) the FWHM should be less than 150 ps, but ideally less than loops.

The optical transmitter apparatus 2 further comprises an integrated optical intensity controller 58 configured to receive the temporally separated first and second light pulses from the respective first 52 and second 54 integrated optical paths. The integrated optical intensity controller 58 is further configured to be able to control the relative intensities of the first and second light pulses output from the controller 58 for transmission to the optical receiver apparatus 4. Therefore the integrated optical intensity controller 58 receives both pulses (split by the splitter 50) along different physical optical paths 52, 54 and provides at least one output optical port 60 wherein the first and second pulses are controllably output from the same output port 60 with varying levels of intensity. The output intensity of one of the first and second pulses from the controller 58 can be increased or decreased relative to the other pulse. If required the optical intensity of at least one of the pulses may be set to zero (therefore that pulse becomes a zero intensity pulse state). When both the first and second pulses are output by the controller 58 (i.e. first and second pulse states have non-zero intensity) the controller 58 may be used to ensure the output intensity of both pulses are the same (or statistically as similar as possible). For example the controller 58 may need to attenuate the first pulse to take into account optical losses the second pulse encountered along the second optical path 54.

The optical transmitter apparatus 2 further comprises a phase modulator 62 configured to change the phase of at least one of the first or second light pulses output from the transmitter apparatus 2. The phase modulator 62 may also be termed herein as a phase controller 62. The phase modulator 62 may in principle be located at any point in the optical path that the first and second pulses take in the transmitter apparatus 2 after they have been split by the splitter 50. FIG. 4a shows the phase modulator 62 co-located along the first optical path 52 whereas FIG. 4b shows the phase modulator co-located along the output 60 of the intensity controller 58.

The phase modulator 62 may be any type of phase modulator 62 in principle that can operate fast enough to independently change the phase of subsequent light pulses that traverse the optical path the phase modulator is associated with. The phase modulator 62 is preferably an integrated optic phase modulator that can change the phase of optical modes guided by an optical waveguide 8. The phase modulator waveguide structure may be formed from any suitable material system, preferably a semiconductor material that can be external controlled to input a phase change (delay) to the light, for example by temporarily changing the refractive index of at least one of the materials giving rise to the effective index of the optical mode (for example by an electrical drive signal). A preferred material for the integrated optic phase modulator is InP because the material has an intrinsic nonlinear electro-optic coefficient and can induce the quantum confined Stark-effect to further enhance the phase modulation allowing for lower power and shorter modulators. InP further allows the integration of other components in a monolithic fabrication process, such as laser sources, optical amplifiers and photodiodes. Other materials can be used for phase modulation such as but not limited to lithium niobate and gallium arsenide. The phase modulator 62 is preferably configured to controllably impart at least a zero to $\pi$ phase change upon light pulses propagating through the phase modulator, more preferably a zero to $3\pi/2$ phase change, most preferably a zero to $2\pi$ phase change.

The operation of the transmitter apparatus 2 described above is now described with reference to the output of pulses according to the quantum cryptographic protocols described with reference to FIGS. 3a-3e. In principle the transmitter apparatus 2 can transmit pulses to any receiver apparatus including, but not limited to a receiver 4 or transceiver 6 described herein.

The apparatus 2 may also output pulse states in accordance with other protocols and other cryptographic tasks, although these are not detailed herein.

When operating the apparatus 2 according to the BB84 protocol, the apparatus 2 may output pulses states according to either of the implementations of the BB84 protocol as described above and shown in FIG. 3a or 3b.

When implementing the top most basis 24 of the implementation of the BB84 protocol shown in FIG. 3a, the apparatus 2 splits a multiphoton input pulse into two time bins using the splitter 50 and the first 52 and second 54 optical paths. The optical intensity controller 58 then selectively outputs only one of the first and second pulses along the optical output port 60. For the top data value of this basis 24 the controller attenuates the first pulse down to zero level intensity whilst allowing the second pulse to be output with a non-zero level intensity. For the bottom data value of the same basis 24 the controller 58 attenuates the second pulse down to zero level intensity whilst allowing the first pulse to be output with a non-zero level intensity.

The arrow in FIG. 3a symbolises the transmission of the pulses to a receiving apparatus 4. The receiving apparatus 4 then splits each pulse into sub pulses, delays the sub pulses by the same time delay as the time delay between the time bins 20, and interferes the first pulse time bin 20 with the second pulse time bin before sending the resulting interfered photons to one or more detectors. In certain examples, the receiving apparatus may use an interferometer with two output ports each terminating in a separate detector. The resulting output from this process of comparing the first and second pulses for the data value is three measured time bins 22 where a pulse in the first measured time bin corresponds to the sub pulse of the first transmitted pulse that propagated the shortest route to the one or more detectors. The middle measured time bin 22 corresponds to the sub pulse from the first pulse that propagated along the delayed path and the sub pulse from the second pulse that propagated along the shorter path. The last measured time bin 22 corresponds to the sub pulse from the second pulse that propagated along the delayed path.

When measuring using the top most basis 24 of the implementation of the BB84 protocol shown in FIG. 3a, the receiving apparatus 4 identifies the data values by the presence of a pulse in the first or last measured time bin.

When implementing the bottom most basis 26 of the implementation of the BB84 protocol shown in FIG. 3a, the transmitter apparatus 2 splits an input pulse into two time bins 20 using the splitter 50 and the first 52 and second 54 optical paths. The optical intensity controller 58 then outputs both of the first and second pulses along the same optical output port 60 (i.e. first and second pulse states have a non-zero intensity. The phase controller 62 is used to change the phase of the output pulses in the different time bins 20. For the top data value the phase controller 62 is driven to impart a zero phase difference between the pulses in each time bin 20, whereas for the bottom data value the phase controller is driven to impart a $\pi$ phase difference between the pulses in each time bin 20.

When measuring using the bottom most basis 26 of the implementation of the BB84 protocol shown in FIG. 3a, the receiving apparatus 4 identifies the data values by the interference 40 of the pulses in the middle measured time bin 22. This may be done in many ways including, but not limited to having and monitoring two integrated optical output ports after an interferometer combiner wherein the interfered pulses in the middle measured time bin 22 will exit from one of the two output ports when the phase difference is zero or from the other output port when the phase difference between the interfered pulses is $\pi$.

When implementing the top 28 and bottom 30 basis of the implementation of the BB84 protocol shown in FIG. 3b, the apparatus 2 splits an input pulse into two time bins using the splitter 50 and first 52 and second 54 optical paths. The optical intensity controller 58 then outputs both of the first and second pulses along the same optical output port 60 (such that both first and second pulse states have a non-zero intensity). The phase controller 62 is used to change the phase of the output pulses in the different transmitted time bins 20. The phase controller 62 is used in the top most basis 28 to impart a $\pi/2$ phase difference between the first and second pulses for one data value and a $3\pi/2$ phase difference between the first and second pulses for the other data value in the same basis 28.

If this basis 28 is implemented using an apparatus 2 shown in FIG. 4a then the phase change is imparted to the first pulse travelling the short path 52 to the controller 58. If this basis is implemented using the apparatus 2 shown in FIG. 4b then the phase change can be implemented on either of the pulses as they output the controller. In either case, the phase modulator 62 needs to be configured to independently change the phase of subsequent pulses that travel via the phase modulator 62.

For the bottom basis 30, the phase controller 62 is used to impart a zero phase difference between the first and second pulses for one data value and a $\pi$ phase difference between the first and second pulses for the other data value in the same basis 30.

In a similar method to the measuring of the bottom most basis 26 in FIG. 3a, the measuring of the bases 28, 30 in this implementation of BB84 is done by examining the interference 40 of the pulses in the middle measured bin 22.

When operating the transmitter 2 according to the COW protocol, the transmitter apparatus 2 may output pulses associated with zero states, one states, and decoy state as described above and shown in FIG. 3c.

When implementing the (non-decoy state) basis 32 of the COW protocol shown in FIG. 3c, the apparatus 2 splits an input pulse into two time bins 20 using the splitter 50 and first 52 and second 54 optical paths. The optical intensity controller 58 then selectively outputs only one of the first and second pulses along the optical output port 60. For the right most data value of the basis 32, the controller 58 attenuates the first pulse down to zero level intensity whilst allowing the second pulse to be output with a non-zero level intensity. For the left most data value of the same basis 32 the controller 58 attenuates the second pulse down to zero level intensity whilst allowing the first pulse to be output with a non-zero level intensity.

Figure 6A:
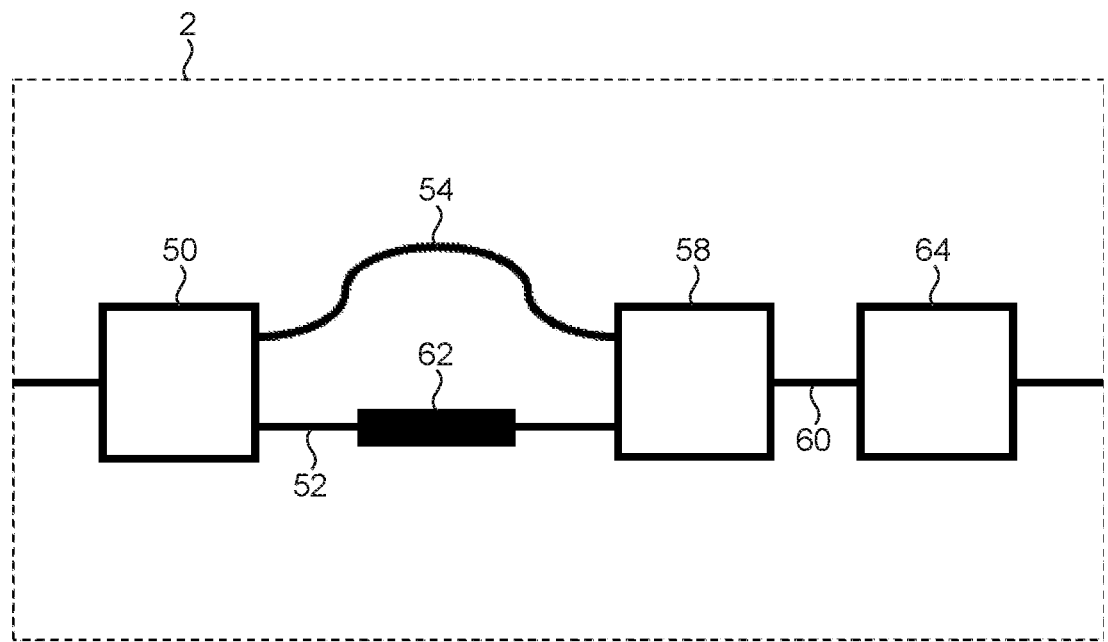
FIG. 6a shows an example of the transmitting apparatus of FIG. 4a further comprising an optical intensity modulator.
Figure 6B:
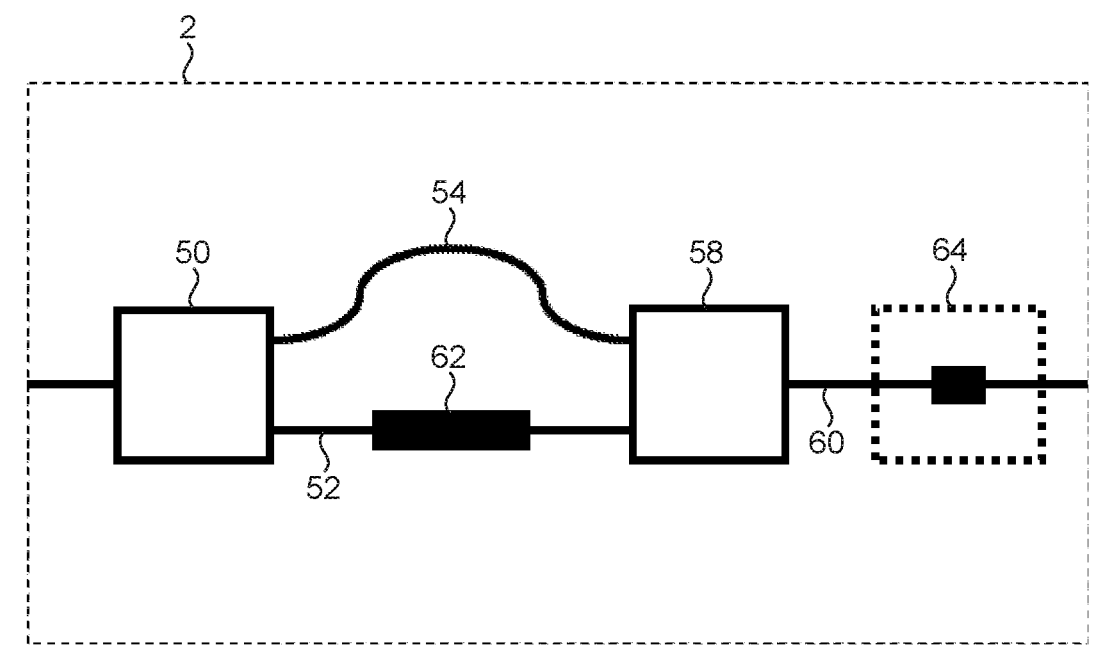
Figure 6C:
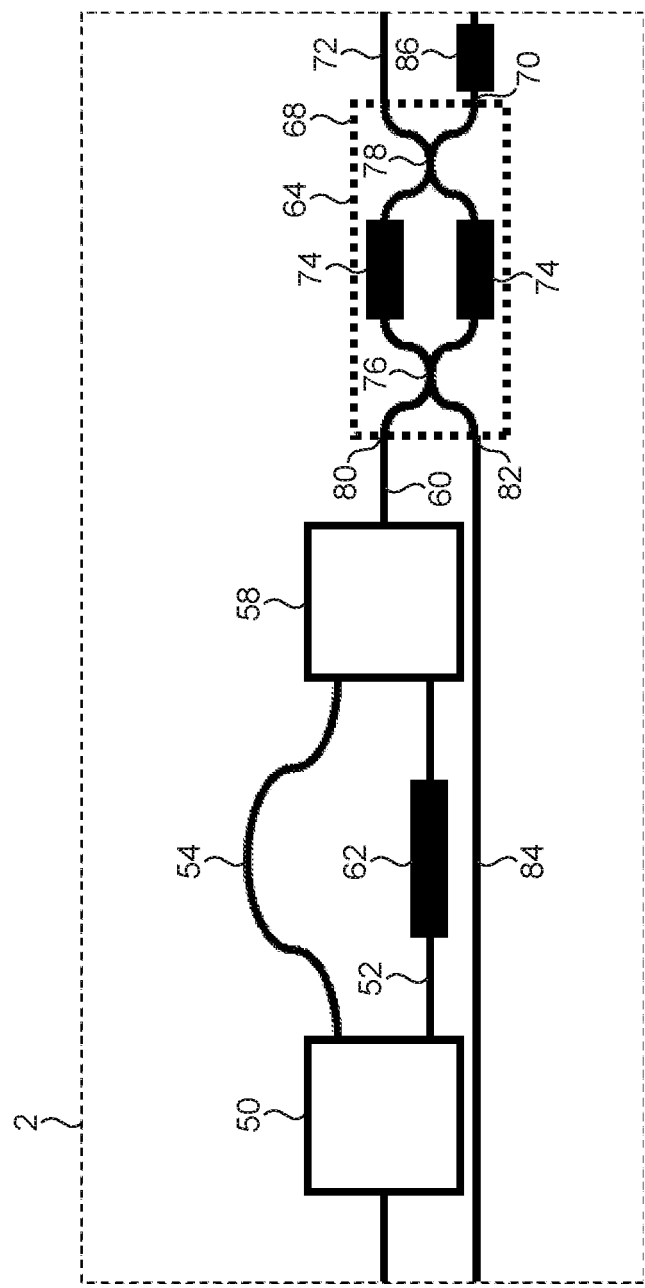

Alternatively, the apparatus 2 may receive input pulses from a pulse source at the repetition rate (hence subsequent pulse time separation) of the time bin separation. The splitter 50 splits the pulses, but the controller 58 is set to only output pulses from one of the first or second paths (that were input to the controller 58). A further separate intensity modulator (not shown in FIG. 4a or 4b) can then be used to modulate the intensity of the pulses output to the receiver 4. An example of such a further intensity modulator is shown in FIGS. 6a-c.

When measuring the received pulses for the COW protocol, a proportion of the incoming pulses are unambiguously discriminated by measuring their time of arrival to generate a secure key. The other proportion are used to assess the coherence and security of the channel by interfering two successive non-empty pulses wherein phase changes on pulse bins resulting from an eavesdropping third party may be detected from examining this interference. When receiving the COW protocol pulses, the incoming pulses may be split into two portions using an optical splitter that nominally divides the intensity of an incoming optical signal into two spatially separate paths. In the regime of using single photons in intended non-zero intensity pulses, the photon is directed into either one of the two spatially separate optical paths where one path measures the timing of the pulse whilst the other is set up to interfere the photon with a photon in an adjacent successive pulse bin. Decoy states intentionally allow this interference measurement by providing two successive non-empty pulses, but can also occur from a random stream.

When implementing the DPS protocol shown in FIG. 3d, the apparatus 2 receives input pulses from a pulse source at the repetition rate (hence subsequent pulse time separation) of the time bin 20 separation. The apparatus 2 then splits the input pulse into two time bins using the splitter 50 and first 52 and second 54 optical paths. The optical intensity controller 58 then selectively outputs only one of the first and second pulses along the optical output port 60 of the controller 58, thus outputting a train of first pulses or a train of second pulses. The phase of each subsequent pulse in the train may be tuned by the phase modulator 62 to provide the phase differences required to encode the data values. In FIG. 4a, the controller 50 would output only the pulses propagating along the first (shorter) optical path because the phase controller 62 is co-located along this path 52.

When measuring the received pulses for the DPS protocol, the interference condition for each successive measured time bin is examined in a similar manner as described above, for example using an unbalanced interferometer.

When implementing the RFI protocol shown in FIG. 3e the apparatus 2 receives input pulses from a pulse source at the repetition rate (hence subsequent pulse time separation) of the time bin 20 separation. The apparatus 2 then splits the input pulse using the splitter 50 and first 52 and second 54 optical paths. The optical intensity controller 58 then selectively outputs only one of the first and second pulses to be output from the optical output port 60, thus outputting a train of first pulses or a train of second pulses. One or more further optical components (not shown in FIG. 4a or 4b) located after the intensity controller can then be used to create the pulses for data values of the X and Y bases by: a) splitting each of the pulses output from the intensity controller 58 into two non-zero intensity optical pulses output along spatially separated optical paths 42, 44; and b) impart a phase difference between the two output pulses. The same further optical components may also be used to create the pulses for the data values of the Z basis by splitting each of the pulses output from the intensity controller 58 into one non-zero intensity optical pulse and another zero-intensity output along spatially separated optical paths 42, 44. An example of such a further optical component that receives pulses from the intensity controller 58 and outputs the RFI bases is an intensity modulator component 64 in FIG. 6c.

In any of the above operational configurations where the intensity controller 58 outputs a zero intensity pulse state for either the first or second pulse, the preferred pulse to reduce to zero intensity is the pulse travelling the longer second 54 path so that path length losses are minimised for the output pulses.

The output pulse states according to any of the protocols output from the intensity controller 58 may be further intensity modulated by other optical components before being transmitted to the receiving device, for example to reduce the mean photon number per pulse.

The pulse states forming the data values of the quantum key may be output from the transmitter apparatus 2 from an integrated optic waveguide such as the output port 60 of the intensity controller 58 or the output port of an integrated optic waveguide of another optical component located after the intensity controller 58 such as a further intensity modulator 64 or splitter element. The output is typically coupled to an optical fibre for transmission to a receiver apparatus.

There now follows further details of optional features, components and configurations of the apparatus 2, any one or more of which can be used to add to or otherwise modify the transmitter apparatus 2 described herein.

Optical Intensity Modulator

The optical transmitter apparatus 2 may further comprise an optical intensity modulator 64, as shown in FIG. 6a, configured to receive any one or more of the first and second pulses output from the optical intensity controller 58 for transmission to the receiver apparatus. Preferably the optical intensity modulator 64 comprises an integrated optic waveguide 8 as described herein. The further optical intensity modulator 64 is also configured to independently change the intensity of subsequent received pulses (from the controller 58) and output any one or more of the first and second pulses for transmission to the optical receiver apparatus.

FIGS. 6b and 6c show example implementations of an optical intensity modulator 64 wherein FIG. 6b shows a single input/single output path intensity modulator 66 configured to selectively and controllably attenuate pulses propagating through the attenuator. An example of such a modulator 66 in this configuration would be an integrated optic electro absorption modulator.

The speed (rate) of intensity modulation of the optical intensity modulator, is preferably be at least as fast as the rate of pulse input from the intensity controller 58. This implementation would require another optical component (not shown) to output pulses according to the RFI protocol which requires pulses to propagate along spatially separated output paths.

FIG. 6c shows an alternative and preferred implementation of an intensity modulator 64 wherein the modulator is a Mach-Zehnder (MZI) type modulator 68. A Mach-Zehnder 68 implementation of this optical intensity modulator 64 may comprise at least two optical output paths 70, 72. One or more phase modulators 74 are associated with at least one of the arms of the MZI in between the splitter 76 and re-combiner 78 of the MZI 68. Preferably one phase modulator 74 on each arm as exemplified in FIG. 6c. The arm phase modulators 74 may have a similar configuration to any of the other types of phase modulator described herein.

Therefore when the further optical intensity modulator 64 is in the MZI configuration 68 it may comprises two output optical paths 70, 72 and is configured to: receive, as an input, at least one of the first or second pulses, split each said pulse into two sub pulses, interfere the said sub pulses at a combiner 78; and output the interfered pulse along at least one of the two optical output paths 70, 72. The MZI 68 may have one or more input ports 80, 82. In a preferred configuration as shown in FIG. 6c, the MZI has 2 input ports, one 80 in optical communication with the output 60 of the controller 58, the other 82 in optical communication with a further input waveguide 84.

The MZI 68 is preferably a balanced MZI with optical arms having an identical optical path length, however in principle an unbalanced MZI may be used as long as the path length difference still allows the pulses recombining after the arms to interfere with sufficient constructive and destructive interference require for the output pulse states for the protocol being transmitted.

At least one of the outputs 70, 72 of the MZI may be input into at least one phase modulator 86 before being transmitted to a receiver device, as shown in FIG. 6c. This phase modulator 86 may take any phase modulator configuration as described elsewhere herein, for example being substantially similar to the phase modulator shown in FIG. 4a. Preferably the phase modulator comprises a section of the waveguide used to output the pulses from the modulator 64. This phase modulator 86 is configured to change the phase of an optical pulse propagating along the said output path towards the receiver apparatus. Having such a configuration of an MZI 68 with a phase modulator 86 associated with an MZI output path 70 allows the transmitter 2 to output pulses in the RFI format. This is achieved by taking each successive pulse input into the intensity modulator 64, configuring the phase modulators 74 in each arm to output a zero or non-zero intensity pulse into one or both of the MZI output ports 70, 72 and changing the phase between the two output pulses on using the phase modulator 86.

For other protocols where only one physical output is required, the MZI 68 can be used to route all of the intensity of the pulses output from the intensity controller 58 through the MZI 68 to the output port 70 for transmission to the receiver apparatus. Alternatively the MZI 68 may be used to route only a portion of the pulse intensity to the output port 70 for transmission to the receiver and route the remaining portion to the MZI output port 72 not intended for the receiver. This may be required for a number of reasons including reducing the mean photon number per pulse. Having pulses with multiple photons within the same pulse typically increases the probability of Eve learning of the key. The configuration shown in FIG. 6c may be used to output pulse states according to BB84, COW, RFI and DPS.

The phase modulator 86 on the output arm of this configuration may be used instead of the phase modulator 62 described above with respect to FIG. 4b wherein the optical intensity modulator 64 (not shown in FIG. 4b) would be inserted between the intensity controller 58 and the phase modulator 86. Alternatively, the transmitter may have both phase modulators 62 and 86 as shown in FIG. 6c.

Intensity Controller

The optical intensity controller 58 can have any configuration in principle. FIGS. 5a and 5b show two alternative configurations for the intensity controller 58. FIG. 5b shows one example being a Y-combiner 90 having two variable optical attenuators 92, such as Electro Absorption Modulators (EAMs) on each input arm of the Y-combiner 90.

Preferably, the optical intensity controller 58 comprises at least two input optical paths 96, 98; at least two intermediate optical arms and at least two output optical paths 60 wherein one of the at least two output optical paths 60 is used to output the pulses intended for transmission to the receiver. At least one arm is associated with a phase modulator 98 configured to change the phase of pulses propagating along the arm.

This configuration may be an MZI 100 (or another interferometer) similar to the MZI 68 configuration for the optical intensity modulator 64 described above, the optical intensity controller 58 is configured to receive any of the input first or second pulses, split each said pulse into two sub pulses and interfere the said sub pulses for output along at least one of the output optical paths. Using this MZI 100 configuration allows the controller 58 to vary the intensity of each of the first and second pulses that are output 60 from the controller 58 for transmission to a receiving device. This may be achieved by controlling the at least one phase modulator 98 associated with one of the optical arms of this MZI. Preferably each arm is associated with a separate independently controllable phase modulator 98 similar to those described elsewhere herein. The phase difference between the sub pulses at the combiner 102 determines the proportion of the light output from the two output ports 60.

When one of the pulses needs to be output with a zero-intensity state then the phase modulators 98 are set so that the MZI 100 is configured to output the full pulse intensity out of the other output port 60 not intended for transmission to the receiver device.

The intensity controller 58 can also be configured to output equal intensity first and second pulses, particularly when one of the optical paths introduces more optical loss than another optical path (for example the longer second optical path being lossier than the shorter first optical path).

Optical Source

Figure 7A:
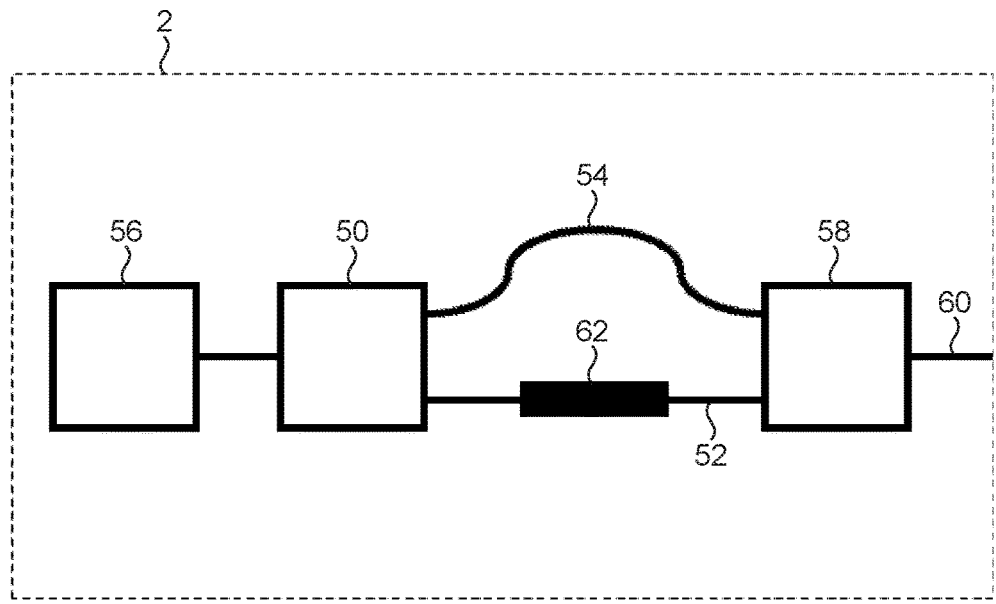
FIG. 7a shows an example of a transmitting apparatus of FIG. 4a further comprising an optical source.
Figure 7B:
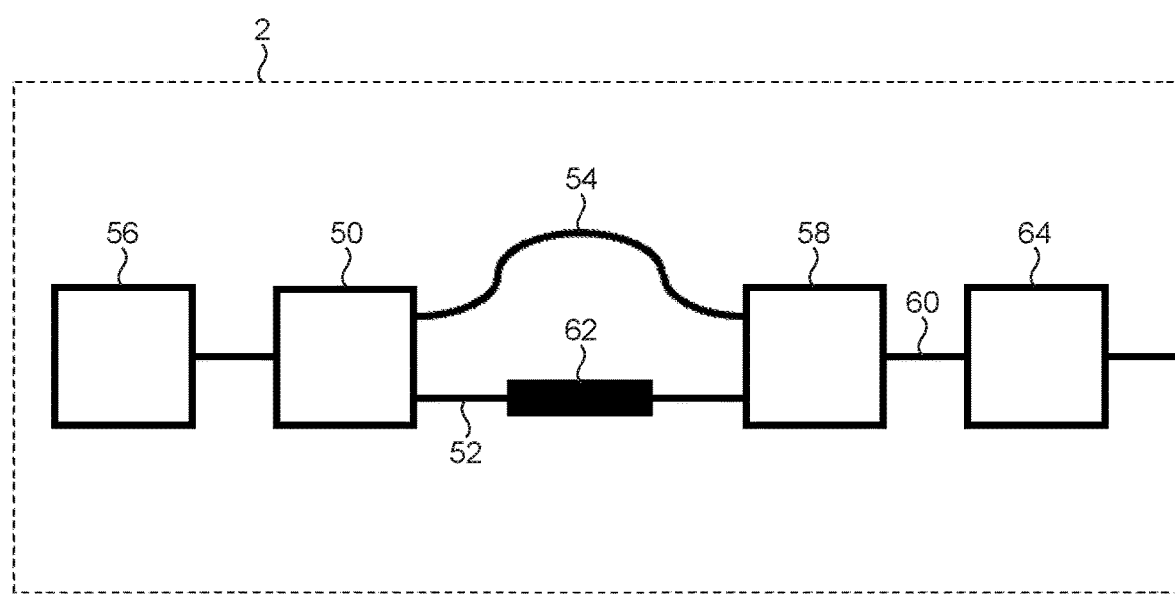
FIG. 7b shows an example of a transmitting apparatus of FIG. 7a further comprising an optical intensity modulator.

FIGS. 7a and 7b show block diagrams of examples of an optical transmitter apparatus 2 as described herein further comprising an optical source 56. The optical source 56 is preferably configured to input pulses to the optical splitter 50 and preferably comprises a light source 104 and a source optical modulator 106 wherein the source optical modulator 106 is configured to receive light from the light source 106 and output light pulses to the optical splitter 50. The source optical modulator 106 may be any intensity modulator, for example an EAM. Preferably the source optical modulator 106 is a balanced interferometer 108 such as an MZI as previously described for the optical modulator 68 above. The source MZI modulator 108 is configured to controllably output light pulses at the desired repetition rate for outputting into the splitter 50.

Figure 8:
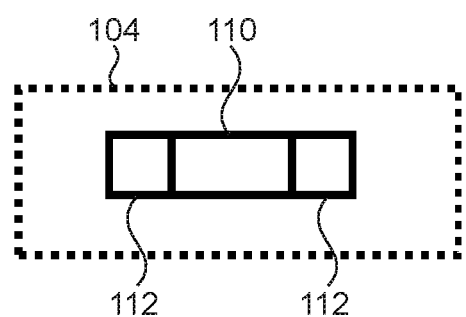
FIG. 8 shows an example of an optical source for use with an optical apparatus described herein.

FIG. 8 shows a preferred example of a light source 104 comprising an integrated optic waveguide gain section 110 (for example a Semiconductor Optical Amplifier (SOA)) located in between two reflection components 112. The integrated optic gain section 110 can be any optical gain section in principle, but preferably comprises a semiconductor waveguide design configured to be electronically pumped to maintain a population inversion. The reflection components 112 may be any optical components in principle that provide reflective optical feedback into the laser cavity gain section 110. The reflection components 112 are preferably tunable Bragg gratings configured to be electrically controlled to adjust the wavelength reflected by the grating. One of the reflection components 112 is coupled to an output waveguide optically linked to the source modulator 106. Having a wavelength tunable and pulsed optical source 56 allows the transmitter apparatus 2 to output pulses according to different protocols using multiple wavelength channels.

In principle other light source 104 may be used. If the apparatus 2 were to operate the BB84 and RFI protocols then the source 104 could possibly comprise incoherent sources like LEDs, or even single photon transmitters that are electrically or optically stimulated. Heralded single photon sources from non-linear processes like SPDC or SFWM may also be used.

Examples of a Transmitter Apparatus

Figure 9A:
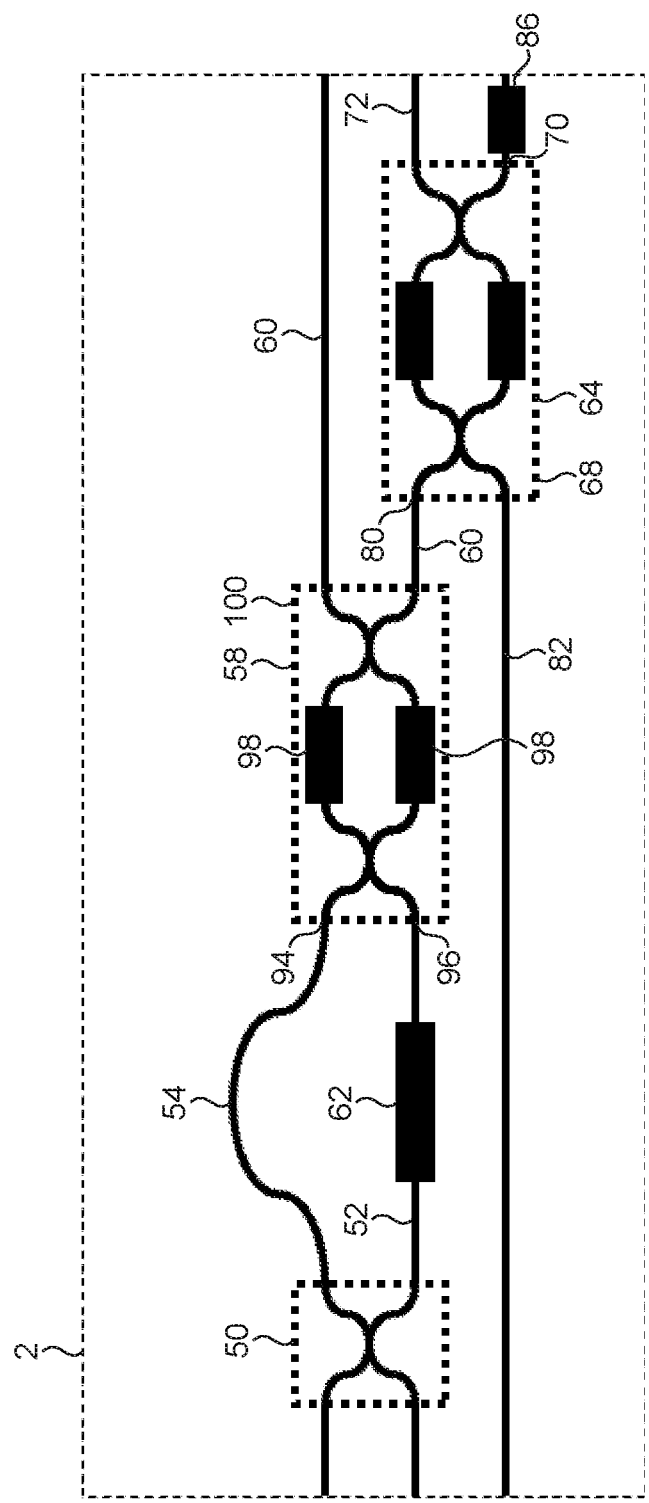
FIG. 9a shows an example of an optical apparatus as described herein.

An example of a transmitter apparatus 2 with a splitter 50, first 52 and second 54 integrated optical paths, intensity controller 58, phase modulator 62, intensity modulator 64 and a further output phase modulator 86 is shown in FIG. 9a. The splitter 50 is a 2×2 coupler such as an MMI coupler. The shorter first 52 optical path optically coupled with the splitter 50 has a phase modulator 62 along its path. The intensity controller 58 is a balanced integrated optic MZI 100 with phase modulators 98 on each intermediate MZI arm. The MZI 100 has two input ports 94, 96 and two output ports 60 and thus may be termed a 2×2 MZI. One of the output ports 60 of the controller 58 is input into the intensity modulator 64. The intensity modulator 64 in this example is a balanced integrated optic MZI 68 substantially similar to the MZI 100 of the controller 58. One of the outputs 70 of the MZI intensity modulator 68 is output into a phase modulator 86, the output of which in turn is intended for the optical receiver apparatus. The other output port 72 of the intensity controller 64 can be monitored to determine the intensity of light exiting the other output port 72.

All of the MZI's in this example use 2×2 MMI couplers as the splitter/combiner elements however in principle other 2×2 couplers may be used.

Figure 9B:
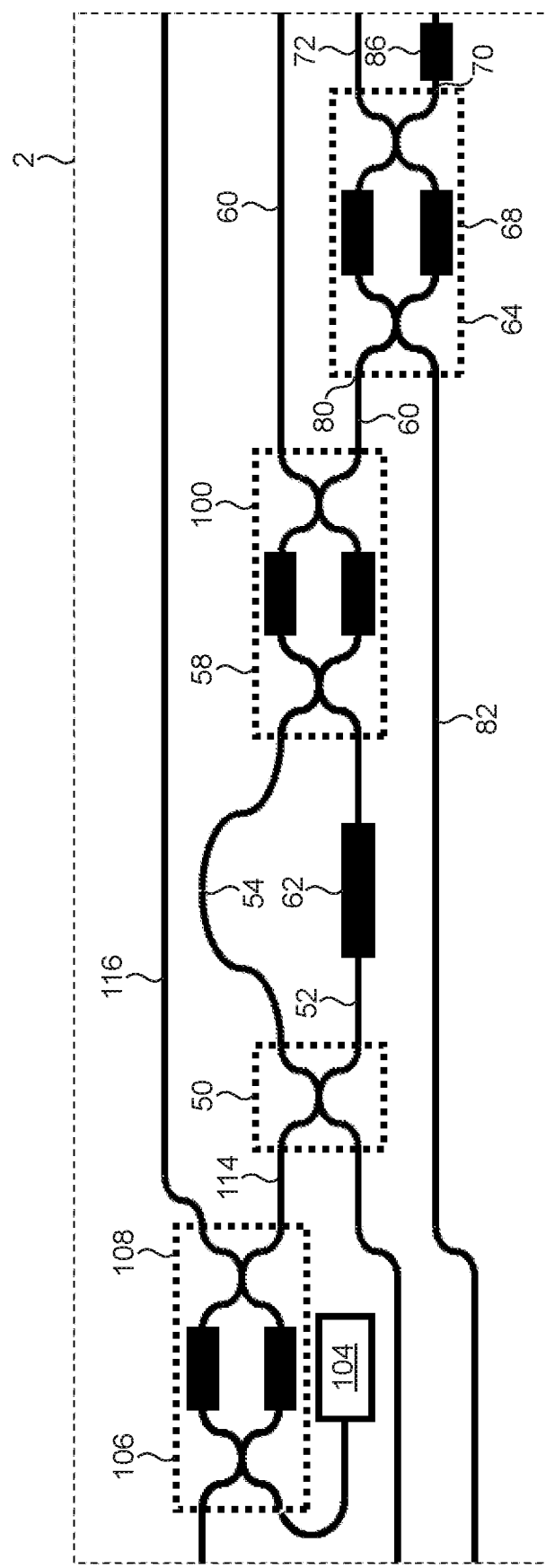
FIG. 9b shows the example of FIG. 9a further comprising an optical source.

A further example of a transmitter apparatus 2 is shown in FIG. 9b. The transmitter apparatus 2 is monolithically integrated onto a single photonic integrated optic chip. This example has similar components as to those shown in FIG. 9a except that the transmitter apparatus 2 further comprises a source 56 comprising the light source 104 described above with reference to FIG. 8 coupled into a 'source' modulator 106 in an MZI configuration 108 as previously described. One of the output ports 114 of the source modulator MZI 108 is use to input pulses into the splitter 50 whilst the other 116 is used to monitor light intensity levels. The source modulator MZI 108 is preferably substantially similar to the MZI 100 of the controller 58.

The monitoring of light intensity levels output from the optical source 56 may be accomplished by inputting the aforementioned light into a photo-sensitive detector which may be optical coupled to the output port 116 by an optical fibre or other optical transmission means. Alternatively any of the monitoring detectors may be located on the same integrated optic chip as the other integrated optic components.

Any of the MZI's used in the apparatus may have any of the redundant (nominally unused) input/output ports optically coupled to waveguides 8 that can be optically accessed (for example by being terminated at an end facet of the chip as shown in FIGS. 9a/9b). Such waveguides 8 may be used to monitor light output from the apparatus 2 and/or input light into the apparatus 2, for activities such as but not limited to testing, characterisation or calibration. Furthermore any of the splitters/combiners used in the interferometer structures preferably have a 50/50 splitting ratio.

Receiver

There is presented herein, as a second aspect, an optical apparatus 4 suitable for outputting light to at least a first 202 and second 204 optical detector for generating a quantum cryptographic key from light pulses received from a further optical apparatus 2, 6. The quantum cryptographic key being generated according to at least one quantum cryptography technique; the quantum cryptography technique at least comparing the phase difference between at least two light pulses.

Figure 10:
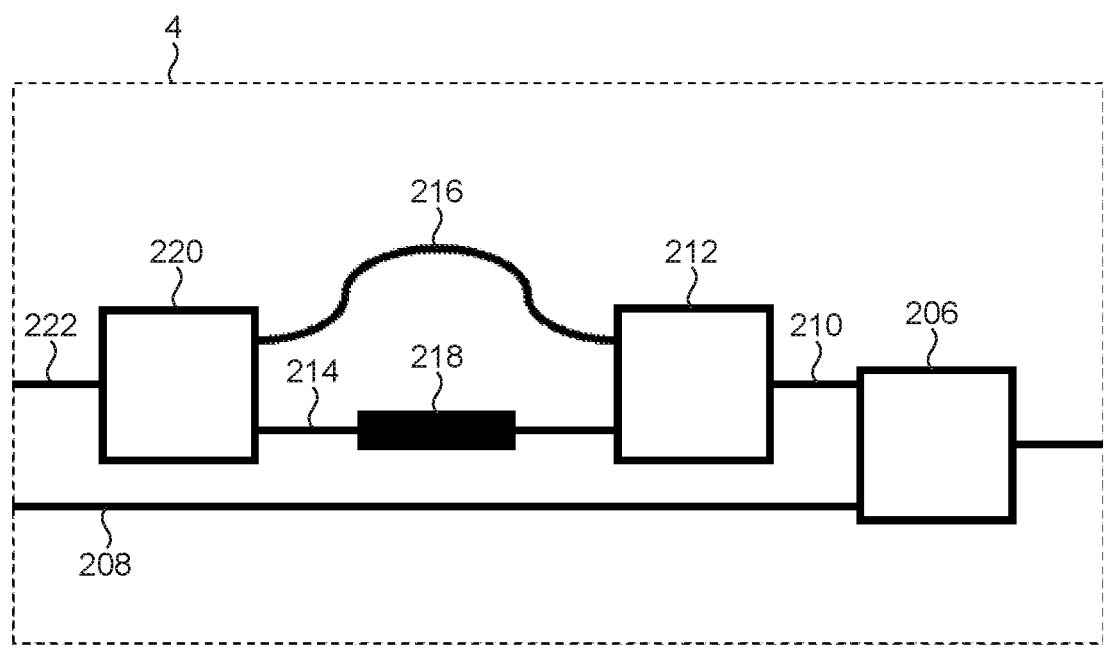
FIG. 10 shows a schematic example of a receiver optical apparatus as described herein.

FIG. 10 shows a block diagram example of such an optical apparatus 4.

The optical apparatus 4 comprises a controllable integrated optical splitter 206 configured to receive at least a first and a second light pulse and control the output intensity of each said pulse between a first 208 and a second 210 output optical path. The first output optical path 208 is configured to be in optical communication with the first optical detector 202 (not shown in FIG. 10).

The optical apparatus 4 further comprises an integrated optical element. This element is configured to receive at least a portion of the said first and second optical pulses from the second output optical path 210 of the controllable optical splitter 206. The element 212 is also configured to split and output each said received pulse into a third light pulse propagating along a first integrated optical path 214 and a fourth light pulse propagating along a second integrated optical path 216. The second integrated optical path 216 comprises an optical path length that is longer than the first integrated optical path 214 and temporally separates the third and fourth optical pulses.

The optical apparatus 4 further comprises a phase modulator 218 configured to controllably change the phase of at least one of the third or fourth light pulses propagating along the corresponding first 214 or second 216 integrated optical paths. FIG. 10 shows this phase modulator 218 to be associated with the shorter first 214 optical path however in principle the phase modulator 218 may be associated with the longer second 216 optical path. Alternatively, separate phase modulators 218 may be associated with each of the first 214 and second 216 optical paths.

The optical apparatus 4 comprises an integrated optical combiner 220 configured to receive the temporally separated third and fourth light pulses from the respective first 214 and second 216 integrated optical paths. The integrated optical combiner 220 is further configured to interfere the fourth light pulse split from the first light pulse with the third light pulse split from the second light pulse and output the combined pulses to the second optical detector 204 (not shown in FIG. 10). In this manner portions of adjacent pulses are interfered.

Therefore, the integrated optical element 212, first 214 and second 216 integrated optical paths and integrated optical combiner 220 may be configured, for some protocols, to form an unbalanced interferometer (for example an unbalanced MZI). The phase modulator 218 may impart the necessary phase difference between the third or fourth light pulses propagating along the first 214 and second 216 integrated optical paths in order to measure a particular protocol basis.

In operation, the receiving apparatus 4 may be configured to analyse the incoming light pulse states (transmitted from a QKD transmitter) for a number of different protocols. For the BB84 protocol the controllable splitter 206 preferably routes all of the incoming light through to the optical element 212 so that none of the light enters the first optical detector 202. The element 212, first 214 and second 216 integrated optical paths and integrated optic combiner 220 are then used to create the three measured time bins 22 as previously described. The optical path difference between the first 214 and second 216 integrate optical paths is preferably set to provide a temporal delay between the third and fourth pulses that is equal to the time delay between successive incoming time bins 20. The optical output 222 from the combiner 220 is used to monitor the timing arrival of single photons, output from the interference of the third and fourth pulses. The combiner 220 may have one or more outputs 220, but is preferably a 2×2 combiner such as but not limited to an MMI, or DC, wherein one of the output ports 222a as coupled to the second detector 204. Preferably the other output port 222b is coupled to a third detector 205 as exemplified in FIG. 13b.

Having two detectors 204, 205 optically coupled to the output 222a, 222b of the combiner 220 allows more accurate monitoring of the interference of the third and fourth pulses. To measure different bases where different phases are used for the pulses in different basis sets, the phase modulator 218 is used to input the required phase change so that the third and fourth pulses interfere at the combiner 220 in a manner that allows the second detector 204 to differentiate between the data values of the same basis set.

When operating the COW protocol the controllable optical splitter 206 is set to tap off a portion of the incoming pulses to the first optical detector whilst the remaining photon signal is coupled to the integrated optional element. This splitting ratio may be any ratio in principle that allows the first detector 202 to detect photons from incoming pulses, for example being configured to split incoming light with a ratio better than (i.e. more equal than) 60/40 (60% going towards the optical element 212) more preferably 50/50). This tap off allows the time of arrival measurements to be used to generate secure key, whilst the other portion of light travels to the element 212, first 214 and second 216 paths and combiner 220 to determine the security of the communication channel using interference as previously described above.

Figure 11A:
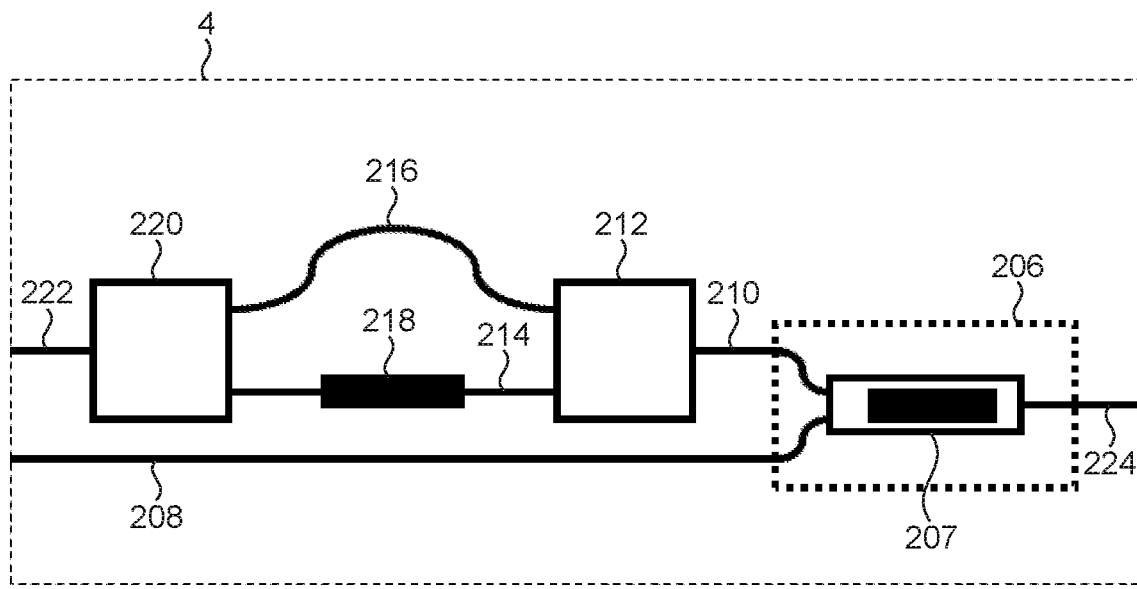
FIGS. 11a and 11b show alternative implementations of the apparatus of FIG. 10.
Figure 11B:
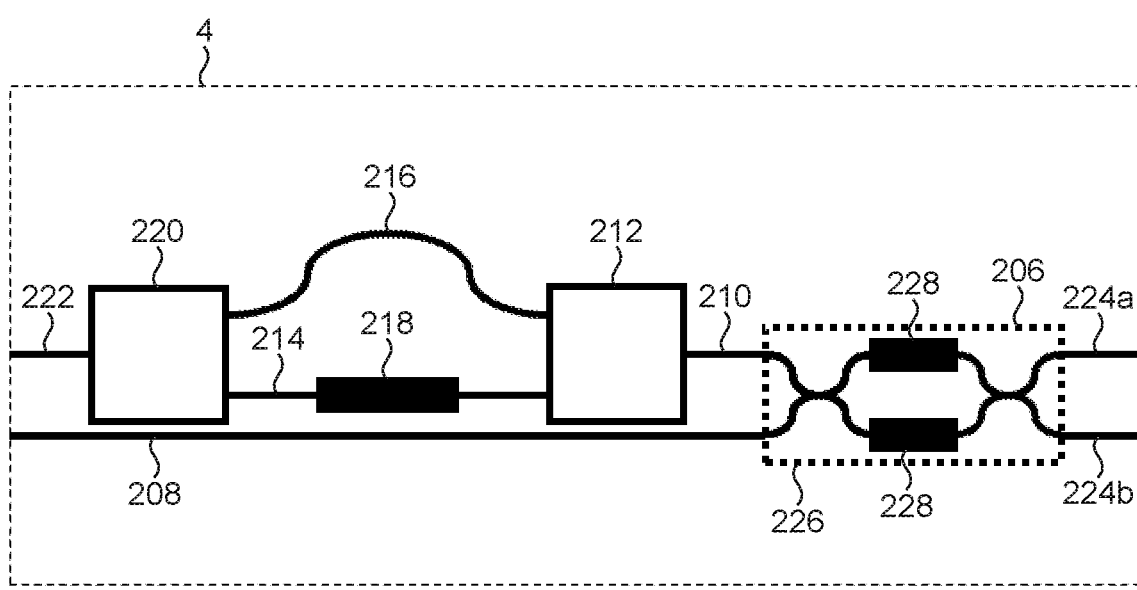

FIGS. 11a and 11b show two examples of different controllable integrated optical splitters 206 that can be used with the optical apparatus 4 although in principle any suitable integrated optical splitter 206 can be used as described above with a controllable output splitting ratio.

FIG. 11a shows an apparatus 4 where the integrated optical splitter 206 comprises an integrated optic coupler 207 having a single optical input port 224 and two optical output ports 208, 210. The coupler 207 is controllable to having a variable splitting ratio of light between the two output ports 208, 210. The coupler 207 may be, but is not limited to, an MMI coupler, a directional coupler or a Y branch coupler. The controllability (i.e. the ability to control the splitting ratio of input light into the two spatially separated output ports 208, 210) may be achieved using any suitable means including an optical effect driven by one or more electronic signals. The optical effect controlling the splitting ratio may be any suitable effect including but not limited to thermo-optic, electro-optic and strain induced optical non-linearity.

FIG. 11b shows an apparatus where the integrated optical splitter comprises an MZI 226 having two optical input ports 224a, 224b and two optical output ports 210, 208. The integrated optical interferometer 226 may comprise of a first optical input path 224a for receiving the first optical pulse path, a second optical input path 224b for receiving a second optical pulse path, at least two interferometric arms and at least one phase modulator 228 associated with one arm and configured to controllably impart a phase change to pulses propagating along the said arm to change the output intensity of each said pulse between the first 208 and second 210 output optical paths. FIG. 11b shows two such phase modulators 228, each one associated with a different arm and configured to control the phase of the light propagating down each arm. The interferometer 226 and components of the interferometer may be similar to those previously described for the optical intensity modulator 64, 68 of the transmitter apparatus 2 wherein the input ports 80, 82 of the modulator 64 of the transmitter apparatus 2 are equivalent to the output ports 208, 210 of the present interferometer 226 and vice versa. Having two input ports 224a, 224b allows the receiver apparatus 4 to operate the RFI protocol wherein the two spatially separated input pulses shown in FIG. 3e are input into the two input ports 224a, 224b of the MZI. The MZI is used to interfere the two input pulses of the X/Y bases and output light to the first detector 202 via one MZI output port 208 and to the second detector 204 via the other MZI output port 210. When monitoring the RFI X and Y bases, the interfering device 226 will be configured so that only one temporal path is taken.

Figure 12A:
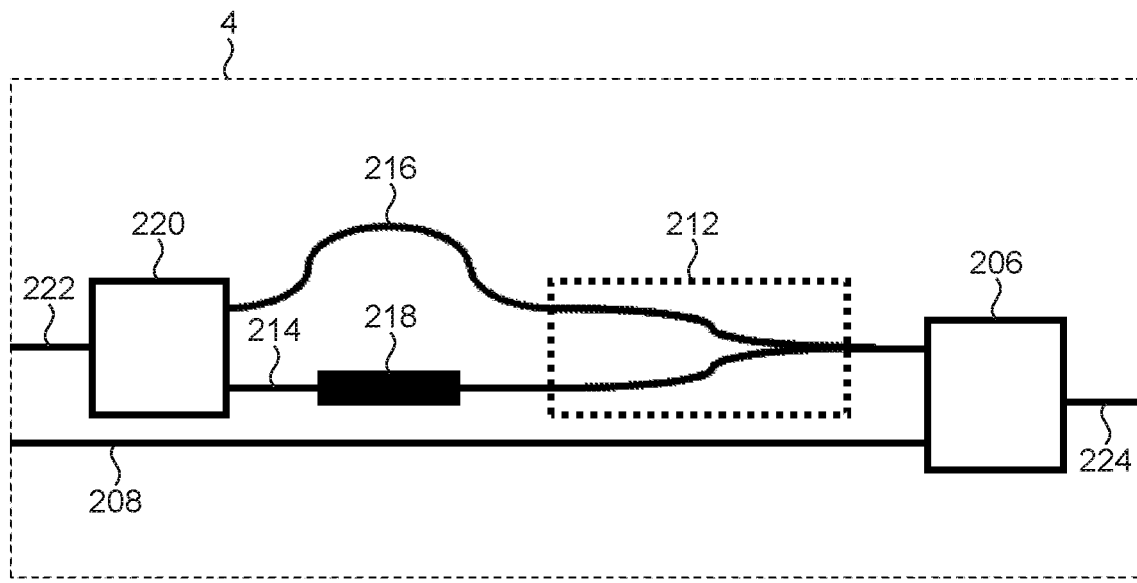
FIGS. 12a and 12b show alternative implementations of the apparatus of FIG. 10.
Figure 12B:
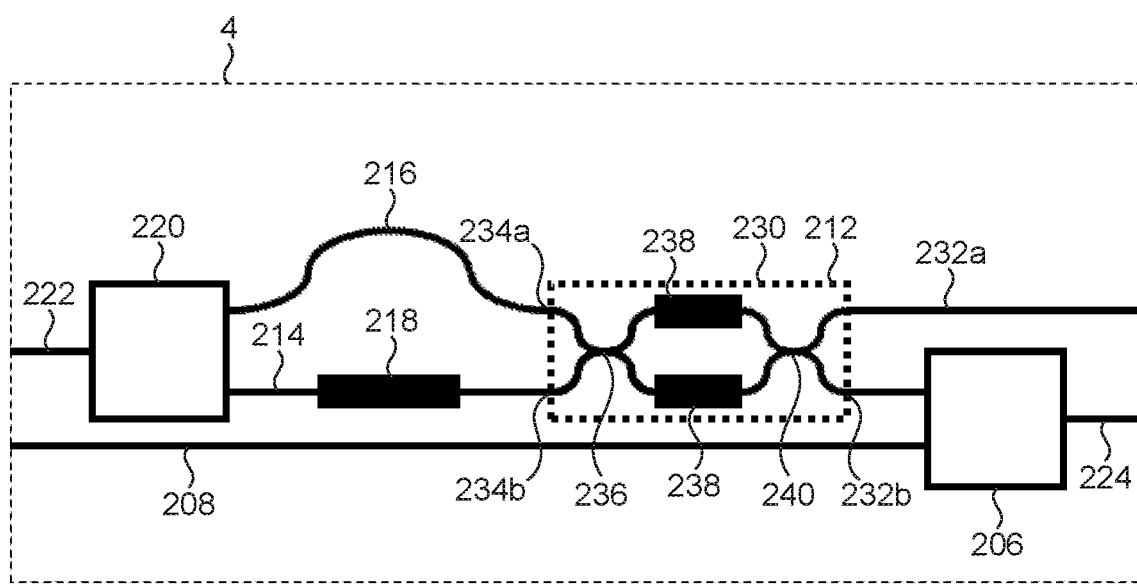

FIGS. 12a and 12b show two examples of integrated optical elements 212 configured to receive pulses from the second output optical path 210 of the controllable optical splitter 206 and split each said received pulse into a third light pulse propagating along a first integrated optical path 214 and a fourth light pulse propagating along a second integrated optical path 216. In principle any integrated optical component can be used including a 1×2 MMI or a Y branch splitter as shown in FIG. 12a.

The integrated optical element 212 preferably comprises an integrated optical intensity controller configured to control the relative intensities of the third and fourth light pulses output from the controller. FIG. 12b shows a preferred example of such a controller comprising an integrated optical interferometer 230. The interferometer 230 comprises an optical input path 232a for receiving optical pulses from the controllable integrated optical splitter 206. FIG. 12b shows the interferometer to have an integrated optic MZI configuration with two optical input ports 232a, 232b and two optical output ports 234a, 234b. The interferometer 230 also comprises at least two interferometric arms. These arms are preferably equal in path length but may in principle have a path length difference that is short enough so that the pulses split into the interferometer arms interfere at the second (output) coupler 236 of the interferometer 230. The interferometer 230 also comprises at least one phase modulator 238 associated with one of the interferometer arms and configured to controllably impart a phase change to pulses propagating along the said arm to change the relative output intensities of the third and fourth pulses output from the splitter 240. FIG. 12b shows two such phase modulators 238, each one associated with a different interferometer arm. The construction of the interferometer, including the splitter 240, combiner 236, interferometer arms, phase controller 238 and input/output optical ports 232a/b, 234a/b, are similar to the interferometer structures described elsewhere herein, structures, features and modifications described for other interferometers may also in principle be used for this controller. Preferably the controller 212 has the same or similar configuration as the optical intensity controller 58 used for the optical apparatus 2 for transmitting pulses wherein input ports of the modulator 58 of the transmitter apparatus 2 are equivalent to the output ports 234a/b of the present interferometer 230 and vice versa.

Alternatively, the optical element 212 may take a configuration similar to the tunable splitter 206 shown in FIG. 11a.

By having an intensity controller 212, the apparatus 4 may be used (when setting up measured time bins 22) to direct a greater portion of light to the longer (second) integrated path 216 to offset inherent optical losses found in that path. In this way the optical intensity of the third and fourth pulses arriving at the combiner 220 are substantially the same and therefore lead to improved interference at the combiner 220 (i.e. producing interference fringes with increased contrast ratio). Alternatively when operating the RFI protocol, the controller 212 can route all of the incoming light into one of the first 214 or second 216 optional paths (preferably the 1st) so that the 2nd detector 204 does not encounter any interference effects (i.e. by routing all light into one of the first 214 or second 216 paths, no overlapping measurement time bins 22 are set up).

Figure 13A:
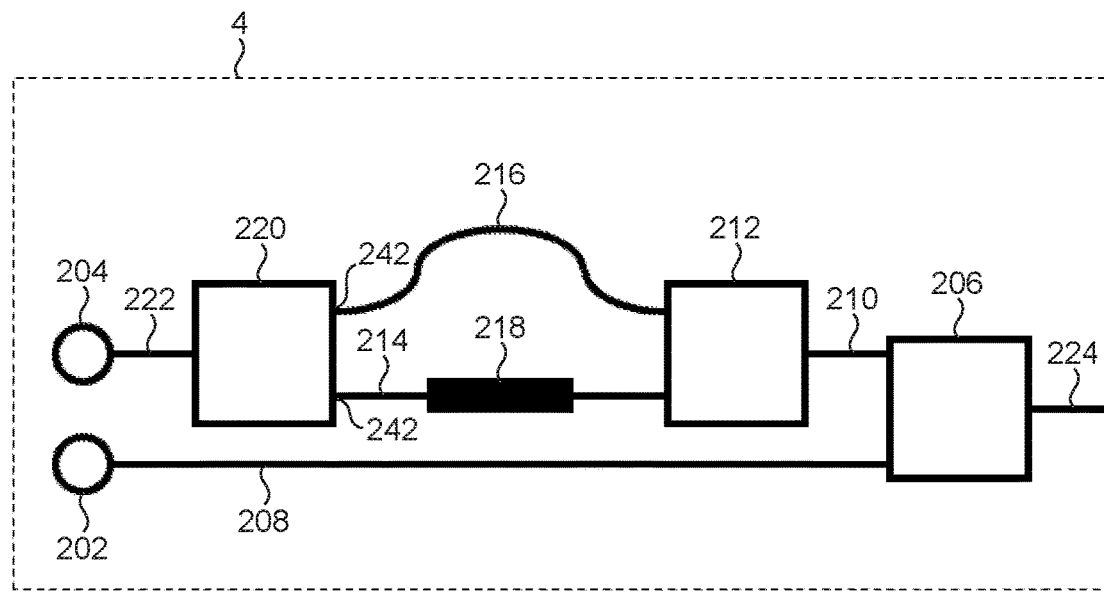
FIGS. 13a and 13b show alternative examples of the apparatus of FIG. 10 further comprising optical detectors.
Figure 13B:
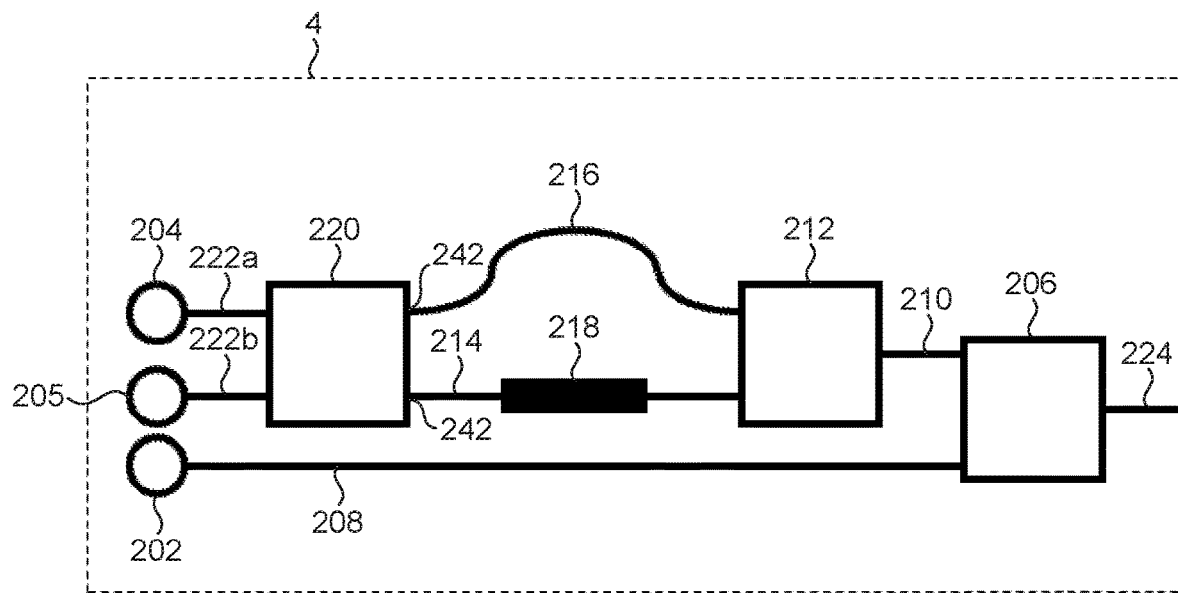

FIGS. 13a and 13b show two different examples of an integrated optical combiner 220 configured to receive the temporally separated third and fourth light pulses from the respective first 214 and second 216 integrated optical paths, interfere the fourth light pulse split from the first light pulse with the third light pulse split from the second light pulse and output the combined pulses. The integrated optical combiner 220 may, in principle, be any combiner including but not limited to a Y combiner, a directional coupler, an MMI coupler. The combiner may in principle have more than two input ports 242 and more than one output port 222, for example FIG. 13a shows a combiner with two input ports 242 and one output port 222 whilst FIG. 13b shows a combiner 220 with two input ports 242 and two output ports 222a, 222b.

Figure 14:
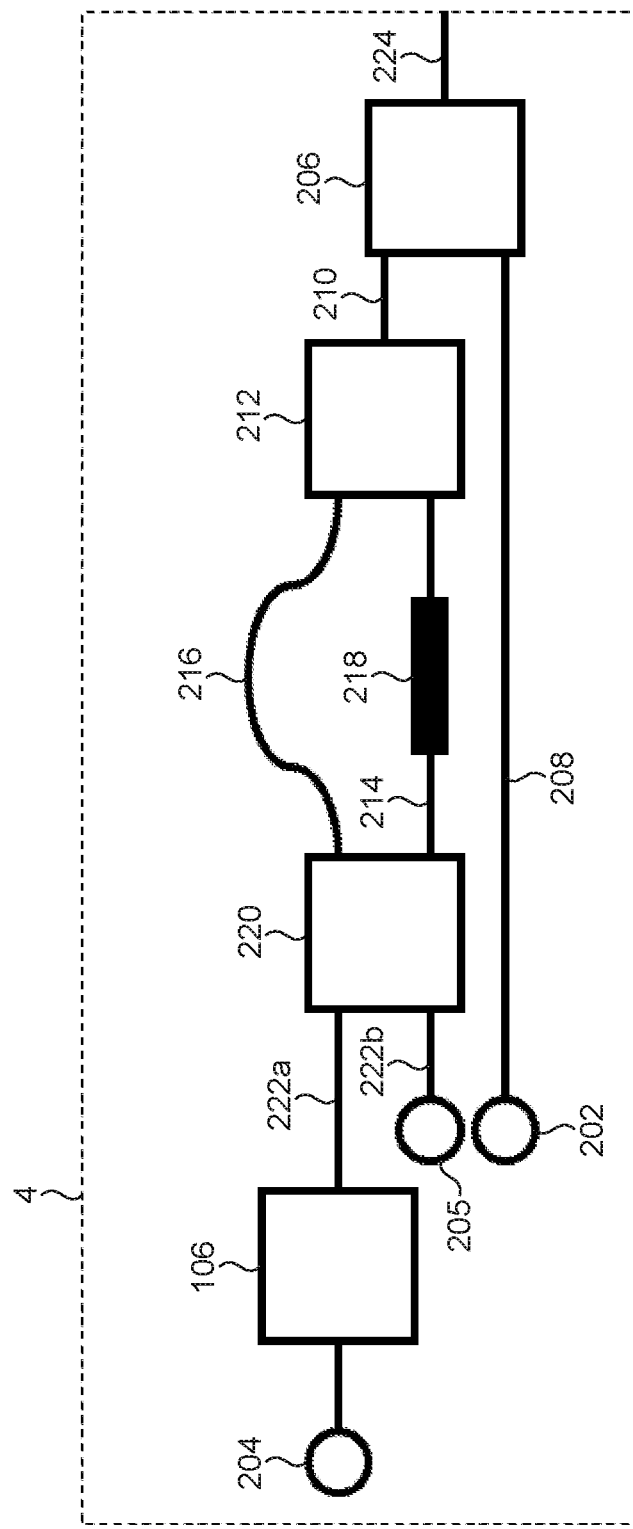
FIG. 14 shows an example of FIG. 13b further comprising a further optical element.

FIG. 14 shows an example of a receiver apparatus 4 wherein one of the outputs 222a of a 2×2 optical combiner 220 is optionally connect to a detector 204 via a further optical component such as a balanced MZI 106. Such a further component 106 may be used to route the light output from the combiner 220 to spatially separate optical paths. Such optical paths may be in optical communication with optical detectors 206 to monitor the light.

Figure 15:
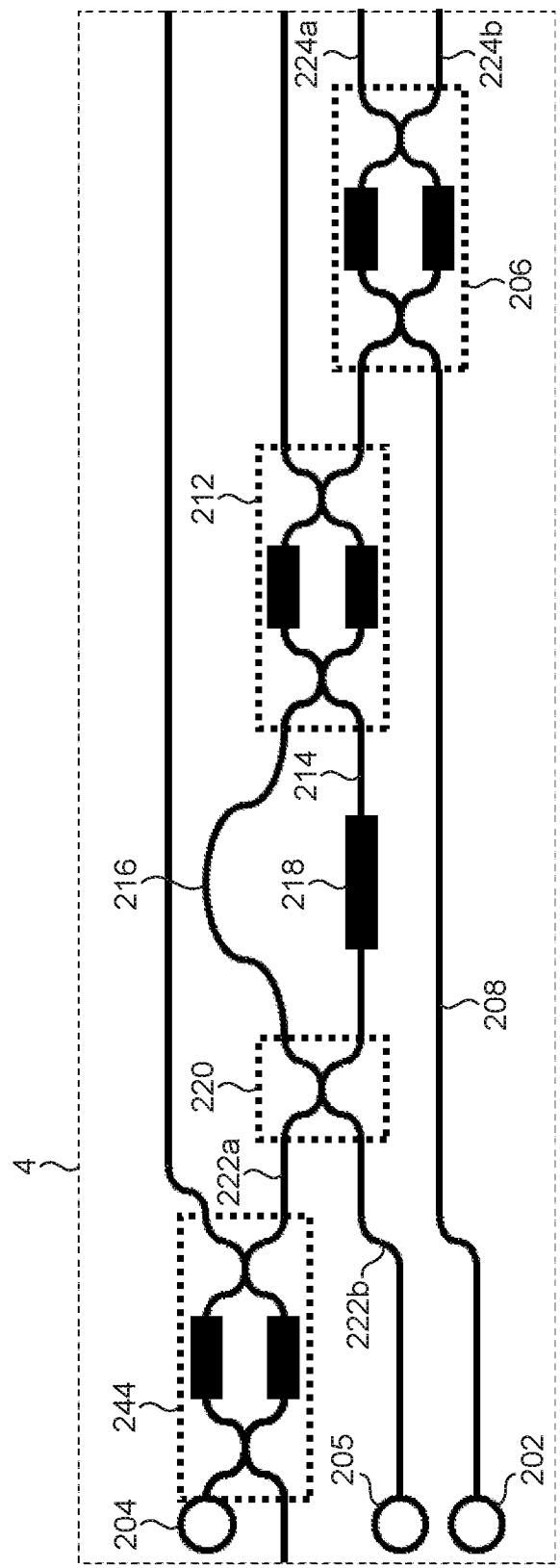
FIG. 15 shows an example of an implementation of the optical apparatus shown in FIG. 14.

FIG. 15 shows an example of a preferred receiver apparatus 4 wherein the controllable splitter 206 and optical element 212 are balanced integrated optical MZIs 226, 230, the combiner 220 is a 2×2 MMI: The apparatus 4 is formed as a monolithically integrated optical chip. A first 202, second 204 and third 205 optical detector are integrated onto the chip, although in principle the detectors 202, 204, 205 may not be part of the apparatus 4 (hence may not be on the chip). A further balanced MZI 244 is located on the chip in between the second detector 204 and the combiner 220. The second detector may in principle be s optically coupled to any one of the 2×2 combiner outputs 222a, 222b. The phase modulator 218 is located on the 1st integrated optical path 214. The redundant optical ports of the optical components on the same chip may be optically accessed in a similar manner to that described for the chip shows in FIG. 9b.

Transceiver

There is presented herein, as a third aspect, an optical apparatus 6 for generating a quantum cryptographic key by encoding and decoding a sequence of light pulses; the quantum cryptographic key generated according to at least one quantum cryptography technique; the quantum cryptography technique at least comparing the phase difference between at least two light pulses.

Figure 16:
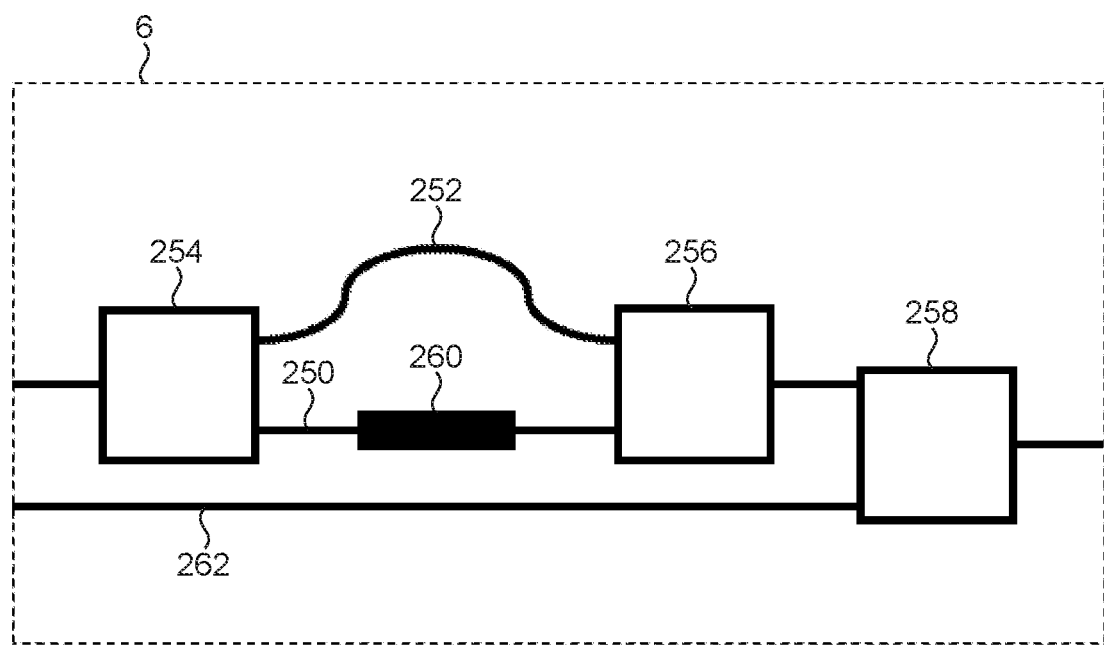
FIG. 16 shows an example of a transceiver optical apparatus described herein.

This apparatus 6 may be termed a transceiver apparatus 6 throughout. FIG. 16 shows a block diagram example of such an optical apparatus 6. The optical apparatus 6 is configured to receive input light pulses from an optical source (not shown in FIG. 16), encode a sequence of said light pulses and transmit the encoded sequence of light pulses to a further optical apparatus 4. The optical apparatus 6 is also configured to receive an encoded sequence of light pulses from a further optical apparatus 2, process the said pulses and output the processed pulses to a first 202 and second optical detector 204 for decoding (detectors not shown in FIG. 16).

As shown in FIG. 16, the apparatus comprises a first 250 and a second 252 integrated optical path, wherein the second path 252 has an optical path length longer than the first 250 integrated optical path. The apparatus 6 further comprises a first integrated optical element 254 in optical communication with the first 250 and second 252 integrated optical paths and the second optical detector 204, and an integrated optical intensity controller 256 in optical communication with the first 250 and second 252 integrated optical paths.

The apparatus further comprises a second integrated optical element 258 in optical communication with the integrated optical intensity controller 256 and the first optical detector 202, and a phase modulator 260 configured to controllably change the phase of light pulses propagating along at least one of the first 250 or second 252 integrated optical paths;

The transceiver apparatus 6 may be used both as a receiver apparatus 4 and transmitter optical apparatus 2 as previously described herein according to the respective first and second aspects. The various optional modifications and features applicable to the first and second aspects are also combinable, where appropriate, with the transceiver apparatus 6 according to the third aspect. The components of the transceiver apparatus 6 may therefore be used to provide equivalent functionality to the components of the transmitter apparatus 2 and receiver apparatus 4. This equivalency is described further below.

The transceiver apparatus 6 may operate as a transmitter apparatus similar to the transmitter apparatus 2 described in the first aspect. When operating in this way the transceiver apparatus 6 comprises the following features as described in the first aspect (transmitter optical apparatus 2). The first optical element 254 of the transceiver preferably functions as the integrated optical splitter 50 (as described for the transmitter 2) that is configured to receive at least one input light pulse, split the input light pulse into a first light pulse propagating along a first integrated optical path and a second light pulse propagating along a second integrated optical path. The integrated optical intensity controller 256 of the transceiver apparatus 6 preferably functions as the integrated optical intensity controller 58 of the transmitter apparatus (as described in the first aspect) configured to receive the temporally separated first and second light pulses from the respective first and second integrated optical paths and control the relative intensities of the first and second light pulses output from the controller 58 for transmission to the further optical apparatus. The second optical element 258 of the transceiver apparatus 6 preferably functions as the intensity modulator 64 of the transmitter apparatus. The phase modulator 260 of the transceiver apparatus 6 has an equivalent function as that described for the phase modulator 62 of the transmitter apparatus 2.

The transceiver apparatus 6 may operate as a receiver apparatus similar to the receiver apparatus 4 described in the second aspect. When operating in this way the transceiver apparatus 6 comprise the following features as described in the second aspect (receiver optical apparatus 2) and shown in FIGS. 10-15.

The second optical element 258 of the transceiver 6 preferably functions as the controllable integrated optical splitter 206 of the receiver apparatus 4 (as described in the second aspect) configured to receive at least a first and a second light pulse and control the output intensity of each said pulse between a first and a second output optical path; the first output optical path configured to be in optical communication with the first optical detector 202.

The integrated optical intensity controller 256 preferably functions as the controllable integrated optical element 212 of the receiver apparatus 4.

The first 250 and second 252 integrated optical paths of the transceiver apparatus 6 are equivalent to the first 214 and second 216 integrated optical paths of the receiver apparatus 4.

The first optical element 254 preferably comprises the integrated optical combiner 220 of the receiver apparatus 4 (as described in the second aspect) that is configured to receive the temporally separated third and fourth light pulses from the respective first and second integrated optical paths, interfere the fourth light pulse split from the first light pulse with the third light pulse split from the second light pulse and output the combined pulses to the second optical detector 204. The phase modulator 260 of the transceiver apparatus 6 has an equivalent function as that described for the phase modulator 218 of the receiver apparatus 4.

For the transceiver apparatus 6 as shown in FIGS. 16 (and 17) the integrated optical splitter 50 described for the first aspect is the same component as the integrated optical combiner 220 of the second aspect wherein the input ports (when used according to the first aspect) are equivalent to the output ports (when used according to the second aspect) and vice versa. The first 52 and second 54 integrated optical paths when used in accordance with the first aspect are the same as the first 214 and second 216 integrated optical paths, when used in accordance with the second aspect.

The transceiver 6 may therefore operate as a transmitter apparatus 2 and/or a receiver apparatus 4 according to the first and second aspects described herein.

The transceiver 6 may operate in both transmitting and receiving modes of operation and in accordance with multiple protocols as previously described in the first and second aspects. The transceiver 6 may be configured to operate as a transmitter 2 and receiver 4 by any appropriate means including time multiplexing the transmitter and receiver pulses so that the phase modulators of the apparatus 6 alternatively impart the phases required for the transmission and receiving operations without one instance of phase change along an optical path effecting the next time interleaved pulse from the other mode of operation.

In operation, the elements of the transceiver apparatus 6 are configured as follows.

When operating as a receiver, the first integrated optical element 254 is configured to optically combine pulses of the encoded pulse sequence output from the first 250 and second 252 integrated optical paths, and output at least a portion of the said combined pulses sequence to the second optical detector 204.

When in transmitter operation the first integrated optical element 254 is configured to receive light pulses from the optical source 56 and split each said pulse into first and second light pulses propagating along first 250 and second 252 integrated optical paths respectively.

When in receiver operation the integrated optical intensity controller 256 is configured to: receive at least a portion of the encoded light pulses output from the second integrated optical element 258 and control the relative intensities of the received light pulses output from the controller 256 into the first 250 and second 252 integrated optical paths.

When in transmitter operation the integrated optical intensity controller 256 is configured to receive the first and second light pulses from the first 250 and second 256 integrated optical paths; and control the relative intensities of the first and second light pulses output from the controller 256.

When in 'receiver' operation the second integrated optical element 258 is configured to receive the encoded pulse sequence from the further optical apparatus; and, control the output intensity of each said received pulse between: a first output 262 in optical communication with the first detector 202; and, a second output path in optical communication with the integrated optical intensity controller 256.

When in 'transmitter' operation the second integrated optical element 258 is configured to receive light pulses output from the integrated optical intensity controller 256 and output said received pulses for transmission to the further optical apparatus.

When in 'transmitter' operation, the second integrated optical element 258 may be configured to receive any one or more of the first and second pulses output from the integrated optical intensity controller 256 and independently change the intensity of subsequent received pulses; and output the any one or more of the first and second pulses for transmission to the further optical apparatus.

The second integrated optical element 258 may comprise at least two output optical paths 264, 266 configured to output and receive light pulses to and from the further optical apparatus.

The second integrated optical element 258 may comprise at least one phase modulator 268 associated with one of the said paths 266, the said phase modulator 268 being configured to change the phase of an optical pulse propagating along the said path.

Figure 17:
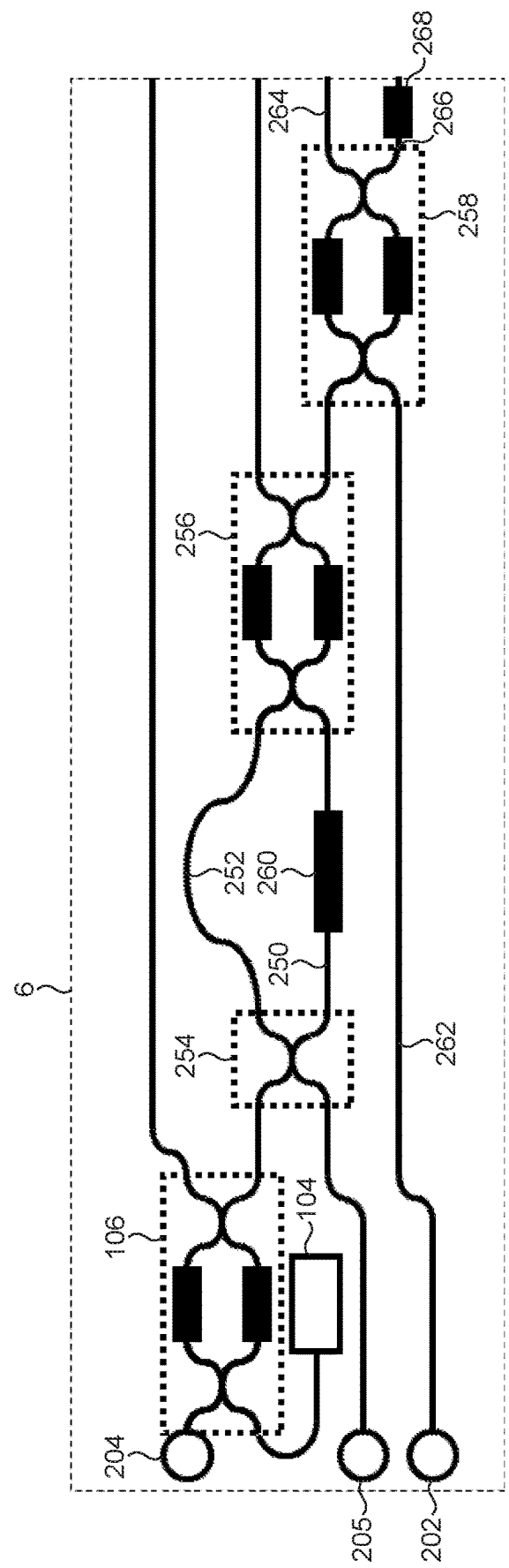
FIG. 17 shows an example implementation of the optical apparatus shown in FIG. 16.

FIG. 17 shows a preferred implementation of the transceiver 6 as being a combination of the components described and shown in FIG. 9b with the components described and shown in FIG. 15. The implementation in FIG. 17 is preferably an integrated optic chip comprising at least the second detector 204, and the optical source 56. The preferred implementation may also comprise the first 202 and/or third 205 detectors. The first optical element 254 is a 2×2 optical coupler, preferably a MMI coupler. The integrated optical intensity controller 256 and second optical element 258 are balanced MZI's as described elsewhere herein.

The transceiver apparatus 6 may further comprise an optical source 56 as shown in FIG. 17, configured to input pulses to the first integrated optical element 254 (when operating as a transmitter being equivalent to the optical splitter 50 as described in the first aspect). The pulse source may comprise a light source 104 and an integrated optical modulator 106 configured to receive light from the light source 104 and output light pulses to the first integrated optical element 254.

When operating as a receiver, the source integrated optical modulator 106 comprises an integrated optic Mach-Zehnder interferometer configured to received light from the first integrated optical element 254 and output the light to the second optical detector 204.

Although claims have been formulated in this application to particular combinations of features, it should be understood that the scope of the disclosure of the present invention also includes any novel features or any novel combinations of features disclosed herein either explicitly or implicitly or any generalisation thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived therefrom.

The invention claimed is:

1. An optical apparatus for transmitting light pulses to a further optical apparatus for generating a quantum cryptographic key according to at least one quantum cryptography technique; the quantum cryptography technique at least comparing the phase difference between at least two light pulses;

the optical apparatus comprising:
I) an integrated optical splitter configured to:
  A) receive at least one input light pulse,
  B) split the input light pulse into:
    i. a first light pulse propagating along a first integrated optical path; and,
    ii. a second light pulse propagating along a second integrated optical path,
  wherein the second integrated optical path comprises an optical path length that:
    iii. is longer than the first integrated optical path; and, iv. temporally separates the first and second light pulses;
and,
II) an integrated optical intensity controller configured to:
C) receive the temporally separated first and second light pulses from the respective first and second integrated optical paths; and,
D) control the relative intensities of the first and second light pulses output from the controller for transmission to the further optical apparatus;
and,
III) a phase modulator configured to change the phase of at least one of the first or second light pulses output from the optical apparatus,
wherein the optical apparatus is an integrated optical apparatus.

2. An optical apparatus as claimed in claim 1 further comprising an integrated optical intensity modulator configured to:
I) receive any one or more of the first and second pulses output from the first optical intensity modulator for transmission;
II) independently change the intensity of subsequent received pulses; and
III) output any one or more of the first and second pulses for transmission to the further optical apparatus;
wherein the integrated optical intensity modulator comprises:
I) at least two optical output paths, and,
II) at least one phase modulator associated with one of the output paths and configured to change the phase of an optical pulse propagating along the said output path.

3. An optical apparatus as claimed in claim 2 wherein:
I) the phase modulator configured to change the phase of at least one of the first or second light pulses output from the optical apparatus is a first phase modulator; and,
II) phase modulator of the integrated optical intensity modulator is a second phase modulator.

4. An optical apparatus as claimed in claim 2 wherein the integrated optical intensity modulator comprises two output optical paths and is configured to:
I) receive, as an input, at least one of the first or second pulses,
II) split each said pulse into two sub pulses,
III) interfere the said sub pulses at a combiner; and,
IV) output the interfered pulse along at least one of the two optical output paths.

5. An optical apparatus as claimed in claim 1 wherein the integrated optical intensity controller comprises:
I) at least two input optical paths; and,
II) at least two intermediate optical arms; at least one arm being associated with a phase modulator configured to change the phase of pulses propagating along the arm; and,
III) at least one output optical path wherein one of the at least one output optical path is used to output the said pulses for transmission to the said further optical apparatus for generating the said quantum cryptographic key;
the first optical modulator configured to receive any of the input first or second pulses, split each said pulse into two sub pulses and interfere the said sub pulses for output along at least one output optical path.

6. An optical apparatus as claimed claim 1, wherein the first phase modulator is associated with one of the first or second optical paths and is configured to change the phase of an optical pulse propagating along the said path.

7. An optical apparatus as claimed in claim 1, wherein the further optical apparatus is configured for outputting light to a first and second optical detector for generating the quantum cryptographic key from light pulses received from the optical apparatus; the further optical apparatus comprising:
a controllable integrated optical splitter configured to receive the first and the second light pulses from the optical apparatus and control the output intensity of each said pulse between a first and a second output optical path; the first output optical path being configured to be in optical communication with the first optical detector;
an integrated optical element configured to:
A) receive at least a portion of the said first and second optical pulses from the second output optical path of the controllable optical splitter; and
B) split each said received pulse into:
i. a third light pulse propagating along a first further optical apparatus integrated optical path; and
ii. a fourth light pulse propagating along a second further optical apparatus integrated optical path,
wherein the second further optical apparatus integrated optical path comprises an optical path length that:
i. is longer than the first further optical apparatus integrated optical path; and
ii. temporally separates the third and fourth optical pulses;
a further optical apparatus phase modulator configured to controllably change the phase of at least one of the third or fourth light pulses propagating along the corresponding first or second further optical apparatus integrated optical paths; and
an integrated optical combiner configured to:
receive the temporally separated third and fourth light pulses from the respective first and second further optical apparatus integrated optical paths;
interfere the fourth light pulse split from the first light pulse with the third light pulse split from the second light pulse; and
output the combined pulses to the second optical detector.

8. An optical apparatus for outputting light to a first and second optical detector for generating a quantum cryptographic key from light pulses received from a further optical apparatus; the quantum cryptographic key generated according to at least one quantum cryptography technique; the quantum cryptography technique at least comparing the phase difference between at least two light pulses;
the optical apparatus comprising:
I) a controllable integrated optical splitter configured to receive at least a first and a second light pulse and control the output intensity of each said pulse between a first and a second output optical path; the first output optical path configured to be in optical communication with the first optical detector;
II) an integrated optical element configured to:
A) receive at least a portion of the said first and second optical pulses from the second output optical path of the controllable optical splitter;
B) split each said received pulse into:
i. a third light pulse propagating along a first integrated optical path; and,
ii. a fourth light pulse propagating along a second integrated optical path, wherein the second integrated optical path comprises an optical path length that:
  iii. is longer than the first integrated optical path; and,
  iv. temporally separates the third and fourth optical pulses;
III) a phase modulator configured to controllably change the phase of at least one of the third or fourth light pulses propagating along the corresponding first or second integrated optical paths; and,
IV) an integrated optical combiner configured to:
  a. receive the temporally separated third and fourth light pulses from the respective first and second integrated optical paths;
  b. interfere the fourth light pulse split from the first light pulse with the third light pulse split from the second light pulse; and
  c. output the combined pulses to the second optical detector,
wherein the optical apparatus is an integrated optical apparatus.

9. An optical apparatus as claimed in claim 8 wherein the controllable integrated optical splitter comprises an integrated optical interferometer comprising:
  I) a first optical input path;
  II) a second optical input path the first and second input optical paths configured to receive any of the first and second pulses;
  III) at least two interferometer arms;
  IV) a first optical combiner configured to receive input from the input paths and divide light into the arms;
  V) a second optical combiner configured to receive input from the arms and output light into the first and second output optical paths; and
  VI) at least one phase modulator associated with one arm and configured to controllably impart a phase change to pulses propagating along the said arm to change the output intensity of each said pulse between the first and second output optical paths.

10. An optical apparatus as claimed in claim 8 wherein the integrated optical element comprises an integrated optical intensity controller configured to control the relative intensities of the third and fourth light pulses output from the controller.

11. An optical apparatus as claimed in claim 10 wherein the integrated optical intensity controller comprises an integrated optical interferometer comprising:
  I) an optical input path for receiving optical pulses from the controllable integrated optical splitter;
  II) at least two interferometer arms, and
  III) at least one phase modulator associated with one arm and configured to controllably impart a phase change to pulses propagating along the said arm to change the relative output intensities of the third and fourth pulses output from the splitter.

12. An optical apparatus for generating a quantum cryptographic key by encoding and decoding a sequence of light pulses; the quantum cryptographic key generated according to at least one quantum cryptography technique; the quantum cryptography technique at least comparing the phase difference between at least two light pulses;
the optical apparatus being configured to:
  A) receive input light pulses from an optical source, encode a sequence of said light pulses and transmit the encoded sequence of light pulses to a further optical apparatus; and
  B) receive an encoded sequence of light pulses from the further optical apparatus, process the said pulses and output the processed pulses to a first and a second optical detector for decoding;
the optical apparatus comprising:
  I) a first and a second integrated optical path, the second path having an optical path length longer than the first integrated optical path;
  II) a first integrated optical element in optical communication with the first and second integrated optical paths and the second optical detector,
  III) an integrated optical intensity controller in optical communication with the first and second integrated optical paths;
  IV) a second integrated optical element in optical communication with the integrated optical intensity controller and the first optical detector; and
  V) a phase modulator configured to controllably change the phase of light pulses propagating along at least one of the first or second integrated optical paths;
wherein:
  i) the first integrated optical element is configured to:
    a) optically combine pulses of the encoded pulse sequence output from the first and second integrated optical paths; and, output at least a portion of the said combined pulses sequence to the second optical detector; and
    b) receive light pulses from the optical source and split each said pulse into first and second light pulses propagating along first and second integrated optical paths respectively;
  ii) the integrated optical intensity controller is configured to:
    c) receive at least a portion of the encoded light pulses output from the second integrated optical element and control the relative intensities of the received light pulses output from the controller into the first and second integrated optical paths; and,
    d) receive the first and second light pulses from the first and second integrated optical paths; and control the relative intensities of the first and second light pulses output from the controller;
  iii) the second integrated optical element configured to:
    e) receive the encoded pulse sequence from the further optical apparatus; and, control the output intensity of each said received pulse between:
      a first output in optical communication with the first detector; and,
      a second output path in optical communication with the integrated optical intensity controller; and
    f) receive light pulses output from the integrated optical intensity controller and output said received pulses for transmission to the further optical apparatus,
wherein the optical apparatus is an integrated optical apparatus.

13. An optical apparatus as claimed in claim 12 wherein the second integrated optical element is configured to:
  I) receive any one or more of the first and second pulses output from the first optical intensity modulator for transmission;
  II) independently change the intensity of subsequent received pulses; and
  III) output the any one or more of the first and second pulses for transmission to the further optical apparatus.

14. An optical apparatus as claimed in claim 13 wherein the second integrated optical element comprises:

I) at least two optical paths configured to output and receive light pulses to and from the further optical apparatus, and, II) at least one phase modulator associated with one of the said paths, the said phase modulator being configured to change the phase of an optical pulse propagating along the said path.

15. An optical apparatus as claimed in claim 12 wherein the second integrated optical element comprises an integrated optic Mach-Zehnder interferometer.

16. An optical apparatus as claimed in claim 12 wherein integrated optical intensity controller comprises an integrated optic Mach-Zehnder interferometer.

17. An optical apparatus as claimed in claim 12 further comprising an optical pulse source configured to input pulses to the optical splitter.

18. An optical apparatus as claimed in claim 17 wherein the pulse source comprises:

I) a light source; and,

II) an integrated optical modulator configured to receive light from the light source and output light pulses to the first integrated optical element.

19. An optical apparatus as claimed in claim 18 wherein the pulse source integrated optical modulator comprises an integrated optic Mach-Zehnder interferometer configured to received light from the from the first integrated optical element and output the light to the second optical detector.

20. An optical apparatus as claimed in claim 12 further comprising at least one of the first or second optical detectors.

* * * * *